(12) United States Patent
Mann

(10) Patent No.: US 11,788,887 B2
(45) Date of Patent: Oct. 17, 2023

(54) TUNABLE NOTCH FILTER

(71) Applicant: Nanohmics, Inc., Austin, TX (US)

(72) Inventor: Chris W. Mann, Austin, TX (US)

(73) Assignee: Nanohmics, Inc., Austin, TX (US)

( * ) Notice: Subject to any disclaimer, the term of this patent is extended or adjusted under 35 U.S.C. 154(b) by 0 days.

(21) Appl. No.: 17/210,993

(22) Filed: Mar. 24, 2021

(65) Prior Publication Data

US 2021/0302231 A1   Sep. 30, 2021

Related U.S. Application Data

(60) Provisional application No. 63/085,014, filed on Sep. 29, 2020, provisional application No. 63/000,804, filed on Mar. 27, 2020.

(51) Int. Cl.

| | |
|---|---|
| *G02B 5/28* | (2006.01) |
| *G01J 3/02* | (2006.01) |
| *G01J 3/12* | (2006.01) |
| *G01J 3/44* | (2006.01) |
| *G02B 5/20* | (2006.01) |

(52) U.S. Cl.
CPC .............. *G01J 3/0227* (2013.01); *G01J 3/12* (2013.01); *G01J 3/44* (2013.01); *G02B 5/204* (2013.01); *G02B 5/284* (2013.01); *G01J 2003/1247* (2013.01)

(58) Field of Classification Search
CPC .......... G02B 5/284; G02B 5/288; G02B 5/28; G02B 6/29395; G02B 26/001; G02B 5/204; G01J 3/0227; G01J 3/12; G01J 3/44; G01J 2003/1247
USPC ....................................................... 359/579
See application file for complete search history.

(56) References Cited

U.S. PATENT DOCUMENTS

| | | | |
|---|---|---|---|
| 5,212,584 A | 5/1993 | Chung | |
| 5,550,373 A * | 8/1996 | Cole | G02B 26/001 |
| | | | 356/519 |
| 7,095,027 B1 | 8/2006 | Boreman et al. | |
| 7,557,918 B1 | 7/2009 | Newman et al. | |

(Continued)

FOREIGN PATENT DOCUMENTS

| | | | | |
|---|---|---|---|---|
| WO | WO-0224570 A1 * | 3/2002 | ............... | B81B 7/02 |
| WO | 2011050272 A2 | 4/2011 | | |

OTHER PUBLICATIONS

Abadi, S. et al., "MAcro-Electro-Mechanical Systems (MÆMS) based concept for microwave beam steering in reflectarray antennas", J Appl Phys, vol. 120: Article ID 054901, pp. 1-8 (Aug. 5, 2016).

(Continued)

*Primary Examiner* — Jade R Chwasz
(74) *Attorney, Agent, or Firm* — Murphy Strategic IP; George L. Murphy

(57) ABSTRACT

A tunable notch filter for operation in reflection mode comprises an antenna layer positioned on a transmissive substrate and a mirror layer positioned on a support substrate. The antenna layer and the mirror layer are positioned on opposite sides of a gap and facing each other, the gap having a gap distance. The notch filter is tuned by adjusting the gap distance between the antenna layer and the mirror layer. Tuning the notch filter to a selected state can cause the filter to selectively attenuate the reflection of at least some electromagnetic radiation that is incident on the transmissive substrate and enters the notch filter.

36 Claims, 18 Drawing Sheets

(56) References Cited

U.S. PATENT DOCUMENTS

| | | | |
|---|---|---|---|
| 7,956,793 B2 | 6/2011 | Puscasu et al. | |
| 7,973,696 B2 | 7/2011 | Puscasu et al. | |
| 8,013,690 B2 | 9/2011 | Miyashiro | |
| 8,750,653 B1 | 6/2014 | Peters et al. | |
| 9,040,913 B2 | 5/2015 | Savoy et al. | |
| 9,160,060 B2 | 10/2015 | Yosui et al. | |
| 9,202,945 B2 | 12/2015 | Colli et al. | |
| 9,214,973 B1 | 12/2015 | Venkatesh et al. | |
| 9,423,301 B2 | 8/2016 | Savoy et al. | |
| 9,595,935 B2 | 3/2017 | Kavousian et al. | |
| 9,712,196 B2 | 7/2017 | Ripley et al. | |
| 9,786,405 B2 | 10/2017 | Afzali-Ardakani et al. | |
| 10,061,116 B2* | 8/2018 | Sano | G01J 3/26 |
| 10,072,970 B1 | 9/2018 | Twede et al. | |
| 10,074,899 B2 | 9/2018 | Wu et al. | |
| 10,084,102 B2 | 9/2018 | Cai et al. | |
| 10,136,077 B1 | 11/2018 | Twede et al. | |
| 10,252,914 B2 | 4/2019 | Arnold et al. | |
| 10,297,752 B2 | 5/2019 | Mann et al. | |
| 2004/0218187 A1* | 11/2004 | Cole | H01L 27/14621 257/E31.115 |
| 2010/0142067 A1* | 6/2010 | Hanamura | G02B 5/284 359/850 |
| 2011/0228397 A1* | 9/2011 | Matsushita | G02B 26/001 359/578 |
| 2012/0019923 A1 | 1/2012 | Niesten | |
| 2012/0300208 A1* | 11/2012 | Sano | G02B 26/001 356/402 |
| 2012/0302188 A1 | 11/2012 | Sahota et al. | |
| 2013/0109022 A1* | 5/2013 | Hwang | B01L 7/52 435/6.12 |
| 2013/0153767 A1 | 6/2013 | Savoy et al. | |
| 2015/0377703 A1 | 12/2015 | Savoy et al. | |
| 2017/0350761 A1* | 12/2017 | Varpula | G02B 26/001 |
| 2018/0040820 A1 | 2/2018 | Mann et al. | |
| 2018/0106933 A1 | 4/2018 | Chanda et al. | |
| 2018/0149943 A9 | 5/2018 | Puscasu | |
| 2018/0184015 A1 | 6/2018 | Richarte et al. | |
| 2018/0340837 A1 | 11/2018 | Safai | |
| 2019/0171001 A1 | 6/2019 | Jin et al. | |
| 2019/0364254 A1 | 11/2019 | Ortiz Egea et al. | |
| 2020/0049891 A1 | 2/2020 | Menard et al. | |
| 2020/0084407 A1 | 3/2020 | Sargent et al. | |
| 2020/0084775 A1 | 3/2020 | Abdelmonem et al. | |
| 2021/0164839 A1* | 6/2021 | Hong | G01J 5/0808 |

OTHER PUBLICATIONS

Balanis, C.A., 2016, "Antenna Theory Analysis and Design", John Wiley and Sons, Inc. Hoboken New Jersey, 4th ed., pp. 798-811.

Bordoloi, A.K. et al., 2011 "A novel approach for post fabrication fine tuning and matching of microstrip patch antenna using adjustable air pocket in substrate layer", 2011 Loughborough Antennas & Propagation Conference, IEEE 2011, pp. 1-3, doi: 10.1109/LAPC.2011.6114026. (Nov. 14-15, 2011).

Chen, H-T. et al., "A review of metasurfaces: physics and applications", Rep. Prog. Phys. vol. 79: 076401 (Jun. 16, 2016).

Costa, F. et al., "Closed-form analysis of reflection losses in microstrip reflectarray antennas", IEEE Transactions on Antennas and Propagation, vol. 60: No. 10 pp. 4650-4660 (Oct. 2012).

Costa, F. et al., "Electromagnetic absorbers based on high-impedance surfaces: from ultra-narrowband to ultra-wideband absorption", Adv Electromagnetics, vol. 1: No. 3 pp. 7-12 (Oct. 2012).

Cui, Y. et al., "Plasmonic and metamaterial structures as electromagnetic absorbers", Laser Photonics Rev., vol. 8: No. 4 pp. 495-520 (2014).

Fang, Z. et al., "Active Tunable Absorption Enhancement with Graphene Nanodisk Arrays", Nano Lett. vol. 14: pp. 299-304 (Dec. 9, 2013).

Gupta, N., "Hyperspectral imager development at Army Research Laboratory", Infrared Technology and Applications XXXIV, B. Andresen, G. Fulop, P. Norton (eds.), Proc. of SPIE vol. 6940: 69401P-10 (2008).

Gupta N. et al., "Performance characterization of tunable longwave infrared notch filters using quantum cascade lasers," Opt. Eng. vol. 57: No. 12 p. 127101 (Dec. 2018).

Gupta, N. et al., "Development of Longwave Infrared Tunable Notch Filters", Abstract Conference on Lasers and Electro-Optics (CLEO), San Jose, CA, USA, IEEE Xplore (Jul. 1, 2019).

Huang, X. et al., "Graphene based tunable fractal Hilbert curve array broadband radar absorbing screen for radar cross section reduction", AIP Advances vol. 4: 117103 (Nov. 3, 2014).

Huang, H. et al., "Design of broadband graphene metamaterial absorbers for permittivity sensing at mid-infrared regions", Scientific Reports vol. 8: 4183 (Mar. 8, 2018).

Jackson Jr, R et al., "A MEMS-based electrostatically tunable circular microstrip patch antenna", J Micromech. Microeng., vol. 17 (2007) pp. 1-8 (Nov. 21, 2006).

Khromova, I. et al., "Tunable Multilayer Graphene Metamaterials for Terahertz/Infrared Waveguide Modulators", Abstract Progress In Electromagnetics Research Symposium, Prag, Czech Republic (2015).

Landy, N. et al., "A Perfect Metamaterial Absorber", Phys. Rev. Lett., vol. 100 (2011) 207402 (May 21, 2008).

Liu, C. et al., "Broadband graphene-based metamaterial absorbers", AIP Advances vol. 8: 015301 (Jan. 3, 2018).

Mao, H. et al., "MEMS-based Tunable Fabry-Perot Filters for Adaptive Multispectral Thermal Imagi", Journal of Microelectromechanical Systems, vol. 25: No. 1 (Feb. 2016).

Milne, J. et al., "Widely Tunable MEMS-Based Fabry-Perot Filter", Journal of Microelectromechanical Systems, vol. 18: No. 4, pp. 905-9813 (Aug. 2009).

Park, J. et al., "Electrically Tunable Epsilon-NearZero (ENZ) Metafilm Absorbers", Scientific Reports vol. 5: 15754 (Nov. 9, 2015).

Rahmanzadeh, M. et al., "Multilayer graphene-based metasurfaces: Robust design method for extremely broadband, wide-angle and polarization-insensitive terahertz absorbers", Applied Optics, vol. 57: No. 4, pp. 959-968 (Jan. 2, 2018).

Rasti, B. et al., "Noise Reduction in Hyperspectral Imagery: Overview and Application", Remote Sens. vol. 3: 482 (Mar. 20, 2018).

Raz A. et al., "Sequential filtering for color image acquisition", Optics Express, vol. 22: No. 22 (Oct. 22, 2014).

Sun J. et al., "An extremely broad band metamaterial absorber based on destructive interference", Optics Express, vol. 19: No. 22 pp. 21155-21162 (Oct. 24, 2011).

Tack, N. et al., "A Compact, High-speed and Low-cost Hyperspectral Imager", Proc. of SPIE, vol. 8266: 82660Q-1 (2008).

Thongrattanasiri, S. et al., "Total light absorption in graphene", Physical Review Letters, vol. 108: 047401 (2012).

Tung, B.S. et al., "Polarization-independent, wide-incident-angle and dual-band perfect absorption, based on near-field coupling in a symmetric metamaterial", Scientific Reports, vol. 7:11507 pp. 1-7 (Sep. 14, 2017).

Turpin, J. et al., "Reconfigurable and Tunable Metamaterials: A Review of the Theory and Applications", International Journal of Antennas and Propagation, vol. 2014: Article ID 429837, pp. 1-18 (May 22, 2014).

Wu, C. et al., "Ultra-thin, wide-angle perfect absorber for infrared frequencies", Proc. of SPIE, vol. 7029, 7029W 1-5 (2008).

Wu, C. et al., "Large-area wide-angle spectrally selective plasmonic absorber", Phys. Rev. B, vol. 84: 075102 1-7 (2011).

Ye, L. et al., "Electrically Tunable Broadband Terahertz Absorption with Hybrid-Patterned Graphene Metasurfaces", Nanomaterials, vol. 8: p. 562 (Jul. 24, 2018).

Yue, W. et al., "High performance infrared plasmonic metamaterial absorbers and their applications to thin-film sensing", Plasmonics, vol. 11:1557-1563 (Apr. 7, 2016).

Zhou, C. et al., "Tunable Fano resonator using multilayer graphene in the near-infrared region", Apppl. Phys. Lett., vol. 112: 101904 pp. 1-5 (Mar. 8, 2018).

Zhou, Q. et al., "Graphene based controllable broadband terahertz metamaterial absorber with transmission band", Materials, vol. 11 2409 pp. 1-8 (Nov. 29, 2018).

Kim, J., et al., "Mechanically actuated frequency reconfigurable metamaterial absorber", Sensors Actuators A:Physical, vol. 299:111619 pp. 1-9 (Sep. 16, 2019).

(56) References Cited

OTHER PUBLICATIONS

Schalch, J., et al., "Terahertz metamaterial perfect absorber with continuously tunable air spacer layer", Appl. Phys. Lett. vol. 113:061113 pp. 1-5 (Aug. 10, 2018).
Tu, X., et al., "Fabry-Pérot cavity-coupled microbolometer terahertz detector with a continuously tunable air spacer gap", Optics Lett vol. 44: No. 4, pp. 1019-1022 (Feb. 14, 2019).
Cuadrado, A. et al., "Material dependence of the distributed bolometric effect in resonant metallic nanostructures", Proc. of SPIE, vol. 8457, pp. 845724-1-10 (Oct. 2012).

* cited by examiner

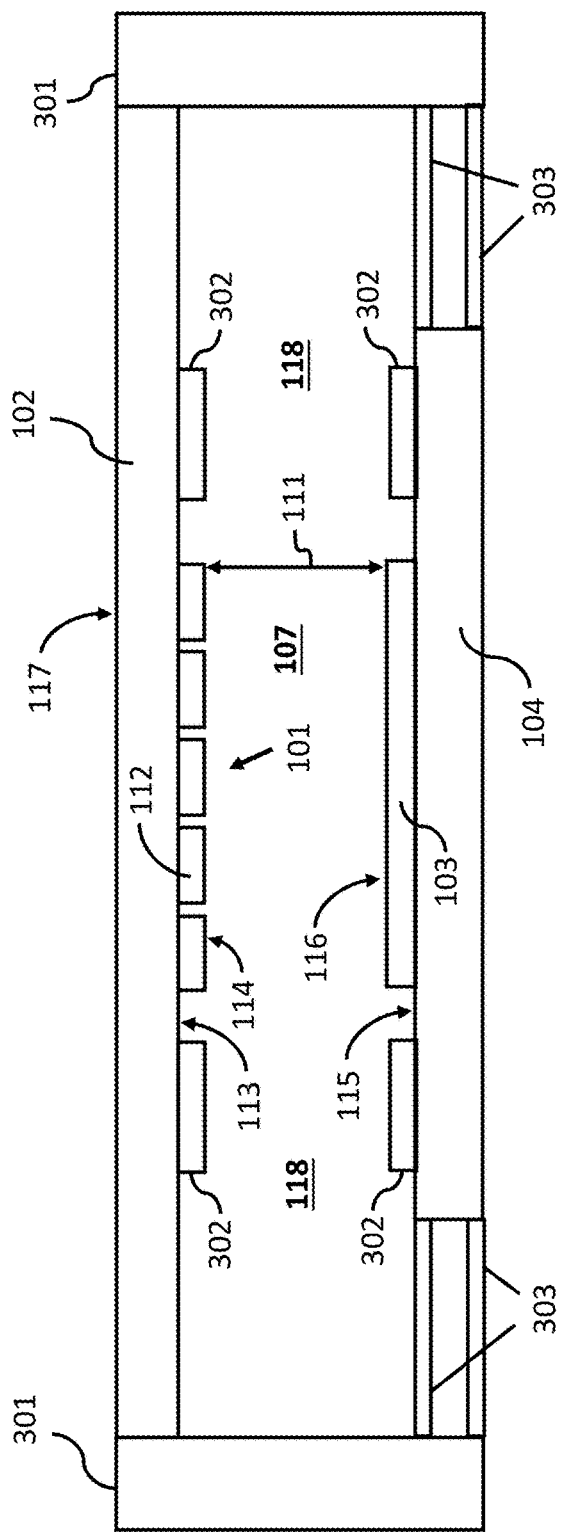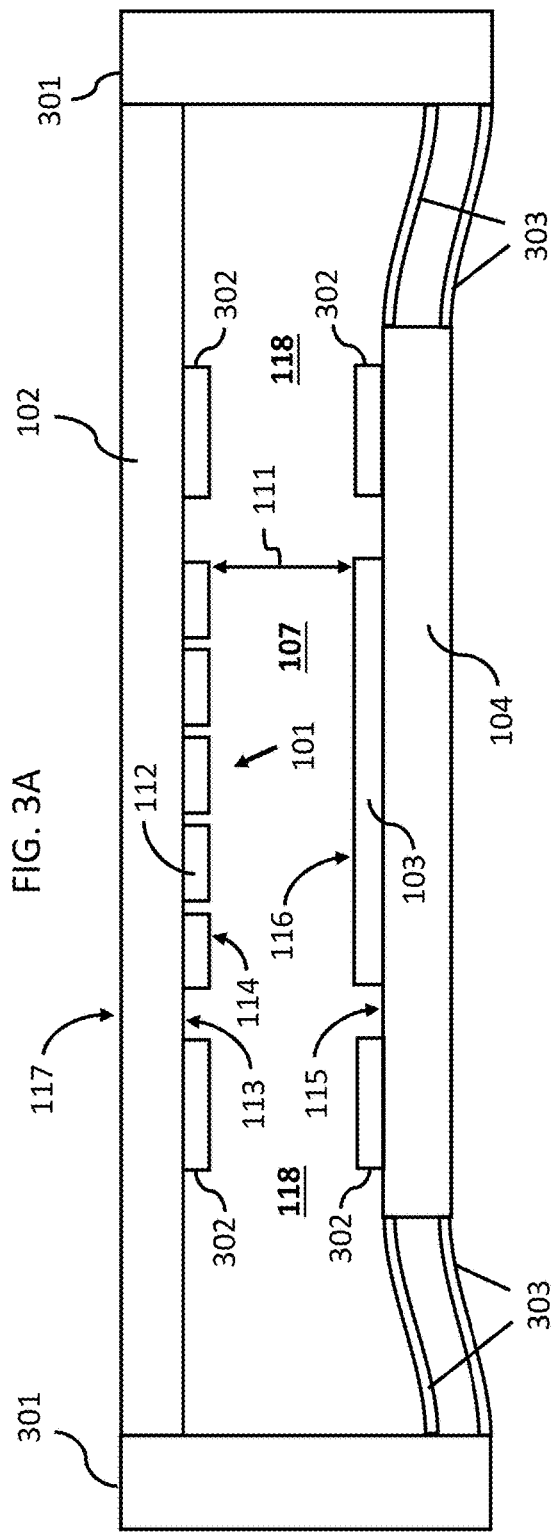

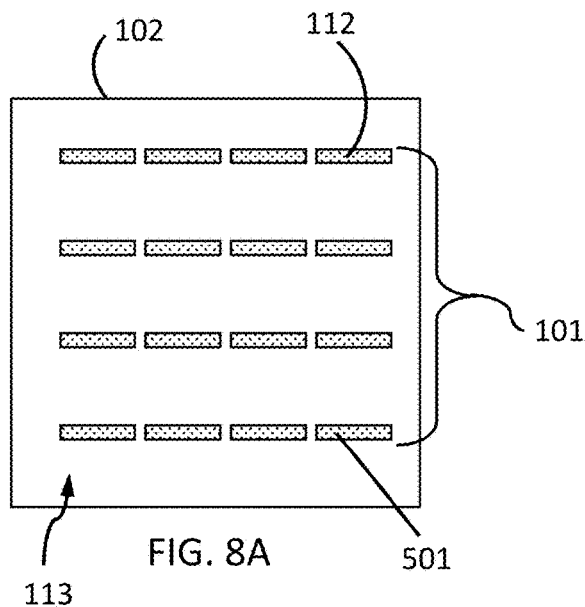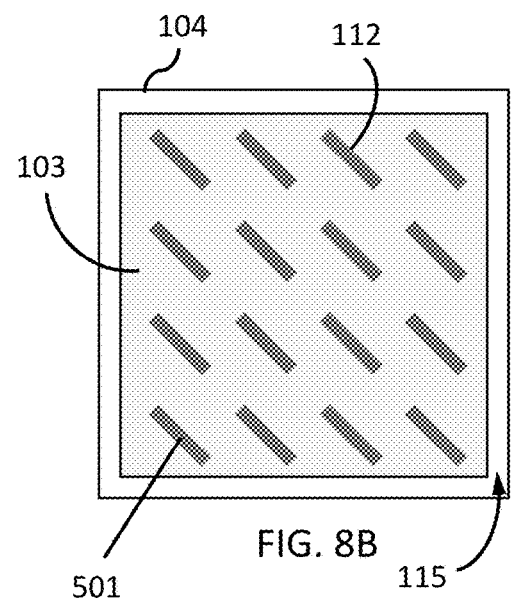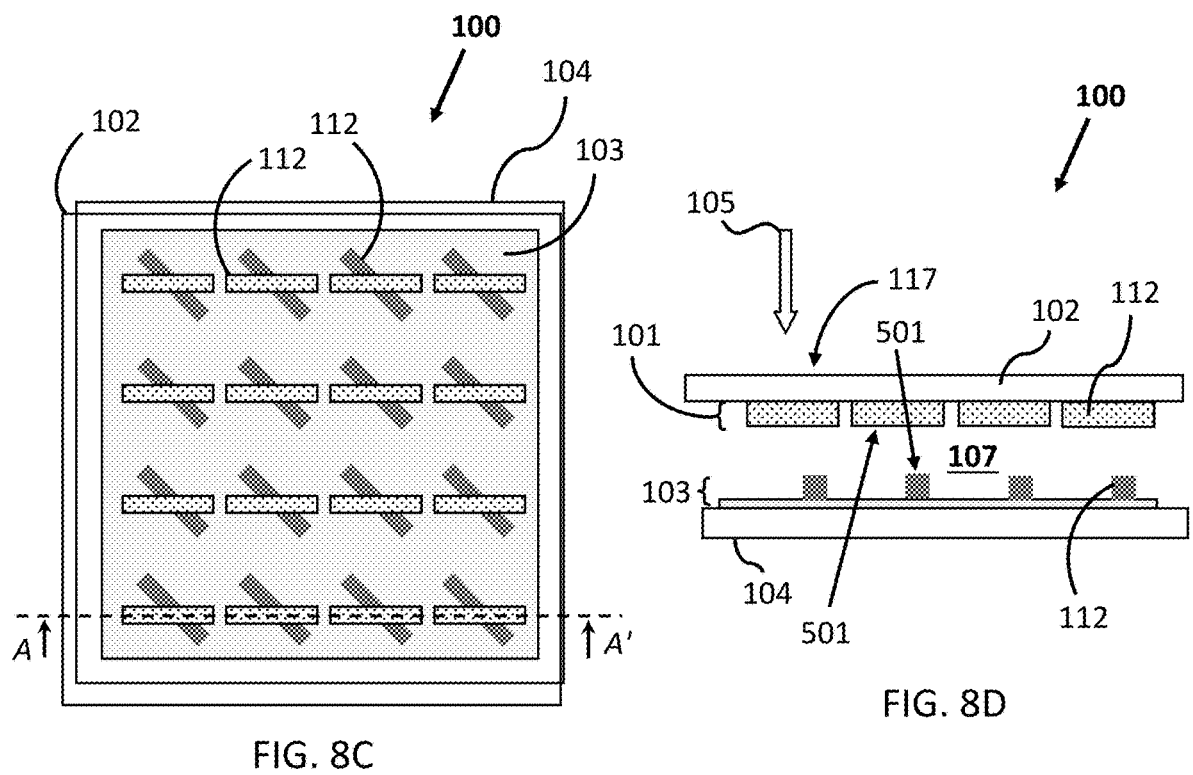

TUNABLE NOTCH FILTER

CROSS-REFERENCE TO RELATED APPLICATIONS

This application claims the benefit of U.S. Provisional Patent Application No. 63/085,014 filed Sep. 29, 2020, which is incorporated by reference herein in its entirety and the benefit of U.S. Provisional Patent Application No. 63/000,804, filed Mar. 27, 2020, which is incorporated by reference herein in its entirety.

STATEMENT REGARDING FEDERALLY SPONSORED RESEARCH

The invention was made, in part, with government support under Contract No. M67854-19-P-6617 awarded by Marine Corps Systems Command. The government has certain rights in the invention.

TECHNICAL FIELD OF THE DISCLOSURE

The disclosure relates to a tunable notch filter for selectively attenuating the reflection of electromagnetic radiation and for use with optical systems.

Notch filters, which can selectively attenuate the passing (by reflection or transmission) of incident electromagnetic radiation within a relatively narrow selected spectral band, can be useful in numerous applications including notch spectroscopy, computational spectroscopy, spectral imaging and mapping, and for reducing unwanted electromagnetic radiation that may have a negative impact on downstream methods or that may cause damage to downstream optical components. For example, in fluorescence and Raman systems, a bright light source may often contaminate or overwhelm a small signature that is to be detected. Using a notch filter to selectively attenuate a band of radiation centered on the wavelength of the bright light source can result in higher signal-to-noise ratios of the other spectral lines (e.g., stokes and anti-stokes peaks). A tunable notch filter can be especially useful with optical systems that encounter changing backgrounds and features, by allowing adjustment of the spectral band of radiation whose reflection or passing is selectively attenuated. Some fluorescence and Raman systems employ a tunable radiation source—a tunable notch filter for use with such a system would allow for matched operation and continuous updating of a notched radiation band so as to remove excess light. To date, such systems have proven challenging to manufacture, often requiring complex optical elements such as for example multiple etalon filters and having have unreasonable constraints on their use, such as for example a requirement for coupling with a specific, limited type of fiber or waveguide.

Notch filters can also be useful for eliminating or reducing the damaging effects of laser radiation that may be employed to intentionally suppress imaging or detection or to intentionally damage optical system components such as photodetectors. In such situations, a rapidly tunable notch filter can be especially useful for attenuating damaging radiation thereby allowing for continuous operation of a susceptible optical system. A tunable notch filter that is capable of being adjusted to allow for passage of broadband radiation can be useful for operation when the damaging source of radiation is removed or eliminated.

Many optical notch filters, for example especially those designed for use in the UV-LWIR range of the electromagnetic spectrum, are formed by preparing multi-layer coatings on a transmissive window and once fabricated cannot be tuned to significantly alter the spectral region of radiation that is prevented from passing through or being reflected by the filter and consequently are inadequate for many applications. To date, many tunable notch filters have limited tuning ranges, e.g., +/−10% on either side of a given wavelength. Typically, tunable notch filters are significantly limited by the angle of arrival of incident radiation and often cannot be reliably or accurately tuned for selective attenuation of the transmission or reflection of electromagnetic radiation that may enter the filter from many different angles, making their use especially challenging or impossible with many optical systems.

SUMMARY

Described herein are embodiments of a tunable notch filter that overcomes many of the limitations of current tunable notch filters and that is designed to function as a reflective filter, so as to selectively attenuate the reflection of one or more selected wavelengths of electromagnetic radiation (EMR) that are incident on the notch filter. Radiation whose reflection is selectively attenuated is absorbed by the notch filter while other radiation is reflected by the filter. The wavelength or wavelength band whose reflection is selectively attenuated, referred to as a notch, can be rapidly adjusted within and across a relatively wide spectral region, such as for example an octave on the electromagnetic spectrum.

The tunable notch filter described herein is broadly tunable and configurable, that is it can be tuned so as to be capable of selectively attenuating the reflection of EMR in a wide range of wavelengths, e.g. wavelengths that are about +/−35% of a center wavelength, thereby enabling the use of the filter over a range that can span an octave or more on the electromagnetic spectrum. The tunable notch filter described herein exhibits improved operational capability with EMR arriving from a broad range of incident angles, providing accurate selective attenuation of the reflection of radiation arriving from angles of up to 60°, thereby allowing for use with many different types of optical systems. Embodiments of the notch filter described herein are radiometrically efficient and largely preserve the momentum of incident radiation with less loss than that observed with other systems. The filter and embodiments described herein demonstrate improved specificity of selection for radiation whose reflection is to be selectively attenuated and can reduce harmonics and unwanted background attenuation of reflection of EMR outside of the selected spectral band.

In some embodiments, a tunable notch filter described herein comprises an antenna layer positioned on a transmissive substrate and a mirror layer positioned on a support substrate, wherein the antenna layer and the mirror layer are positioned on opposite sides of a gap and facing each other, the gap having a gap distance, and wherein the notch filter is tuned by adjusting the gap distance between the antenna layer and the mirror layer. In some aspects, the gap is devoid of a structural element and may be filled with a fluid that is a liquid or a gas, or the gap may be a vacuum gap. As used herein "a gas" refers to a gaseous fluid that may be a pure gas, a mixture of pure gases, a molecular compound, or a gaseous fluid that comprises one or more of any of those. In some embodiments, a transmissive substrate on which an antenna layer is positioned and a support substrate on which a mirror layer is positioned are part of an integrated mechanical fixture, and in some embodiments they may be associated with separate mechanical fixtures.

A tunable notch filter described herein may further comprise a gap distance sensor and/or a gap-adjusting device. The antenna layer and the mirror layer may each comprise a continuous film of conductive material. In some aspects, one or more of the antenna layer and the mirror layer may comprise a plurality of discrete surface features, which in some aspects may be grouped into one or more than one arrays. Surface features of an antenna layer or mirror layer may comprise a plurality of layers of materials. A tunable notch filter described herein may comprise a transmissive substrate that is a prism. In some embodiments, a tunable notch filter described herein may be part of an optical system, which can comprise a detector, an image sensor, or other imaging optic. A tunable notch filter described herein can be configured for selectively attenuating the reflection of at least one wavelength of EMR that is incident on the notch filter and can be configured for selectively attenuating the reflection of at least one wavelength of EMR having at least one polarization state. A notch filter described herein can be useful for analyzing EMR that is incident on the notch filter and/or EMR whose reflection is selectively attenuated and for constructing a spectral map of EMR selectively reflected by or incident on the notch filter.

Throughout this application including in the claims, the symbol "~", which means "approximately", and the term "about" indicate that a value includes plus or minus 10% of the value. For example, "about 4" or "~4" means from 3.6-4.4 inclusive of the endpoints 3.6 and 4.4, and "about 1 nm" means from 0.9 nm to 1.1 nm inclusive of the endpoints 0.9 nm and 1.1 nm. As used herein, the term "equal" and its relationship to the values or characteristics that are "substantially equal" would be understood by one of skill in the art. Typically, "substantially equal" can mean that the values or characteristics referred to may not be mathematically equal but would function as described in the specification and/or claims. All size ranges described herein are inclusive of the lower and upper limit values. As used herein, the phrase "at least one or more of A, B, or C" is meant to include one or more of only A, one or more of only B, one or more of only C, or any combination of elements or steps listed. For example, the combinations AB, AC, BC, and ABC are meant to be included by use of this phrase. Also, any combinations having a plurality of one or more of any of the elements or steps listed are meant to be included by use of this phrase. A similar phrase for longer lists of elements or steps is also contemplated to indicate each element or step alone or any combination of one or more of any of the elements or steps listed.

BRIEF DESCRIPTION OF THE FIGURES

The following drawings form part of the present specification and are included to further demonstrate certain aspects of the invention. Embodiments of the invention may be better understood by reference to one or more of these drawings in combination with the detailed description of specific embodiments presented herein. The use of a letter following an element number is for descriptive purposes only. For example, 202a and 202b each refer to a notch depth 202, but refer to separate notch depths in a figure as an aid in understanding the description of the figure. The following drawings are not necessarily drawn to scale or intended to be. For purposes of clarity, every component or structure that may be part of a tunable notch filter may not be depicted in every drawing, and every figure may not depict all components and structures or all measurements described herein. In some drawings and views, for purposes of clarity and for understanding embodiments of the invention, the relative sizes of structural elements are not necessarily reflective of actual relative sizes in embodiments of the invention.

FIGS. 3A-3B are schematic side view representations of an embodiment of a tunable notch filter.

FIGS. 8A-8D show an embodiment of notch filter and surface feature patterns of an antenna layer and a mirror layer.

DETAILED DESCRIPTION

In some embodiments, a tunable notch filter for operation in reflection mode comprises an antenna layer positioned on a transmissive substrate and a mirror layer positioned on a support substrate, wherein the antenna layer and the mirror layer are positioned on opposite sides of a gap and facing each other, the gap having a gap distance, and wherein the notch filter is tuned by adjusting the gap distance between the antenna layer and the mirror layer.

Figure 1A:
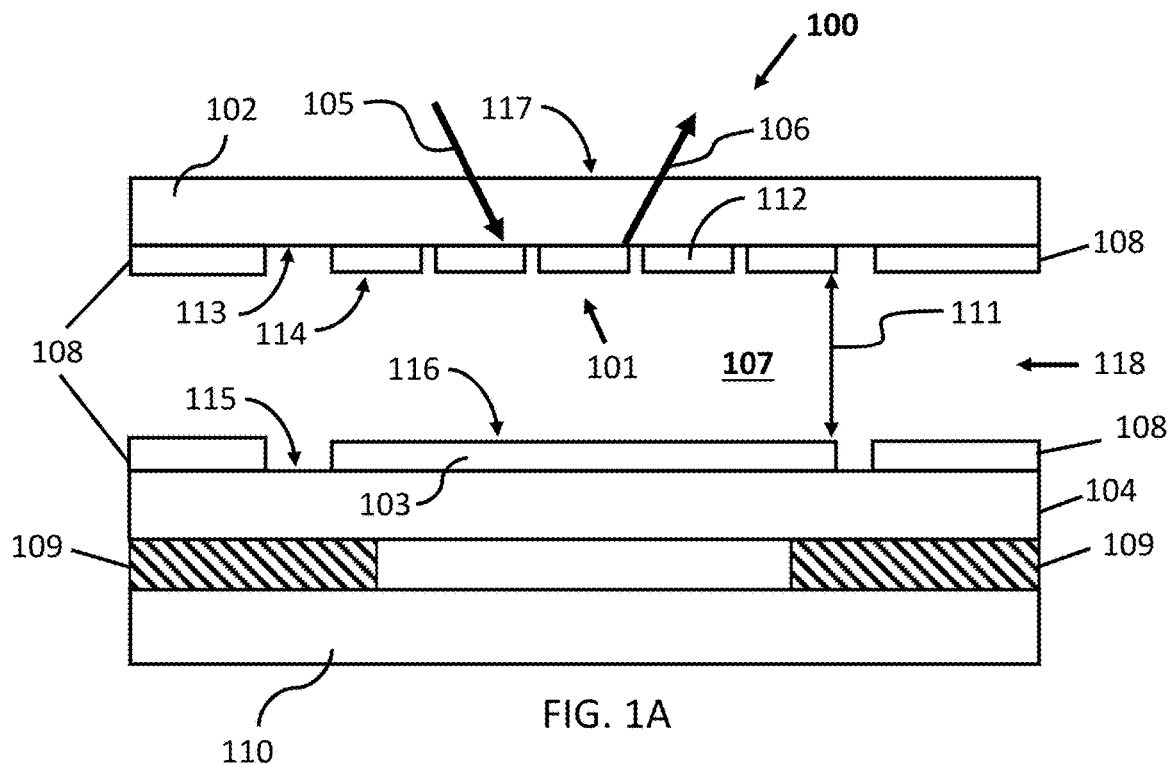
FIGS. 1A-1B are schematic side view representations of embodiments of a tunable notch filter.
Figure 1B:
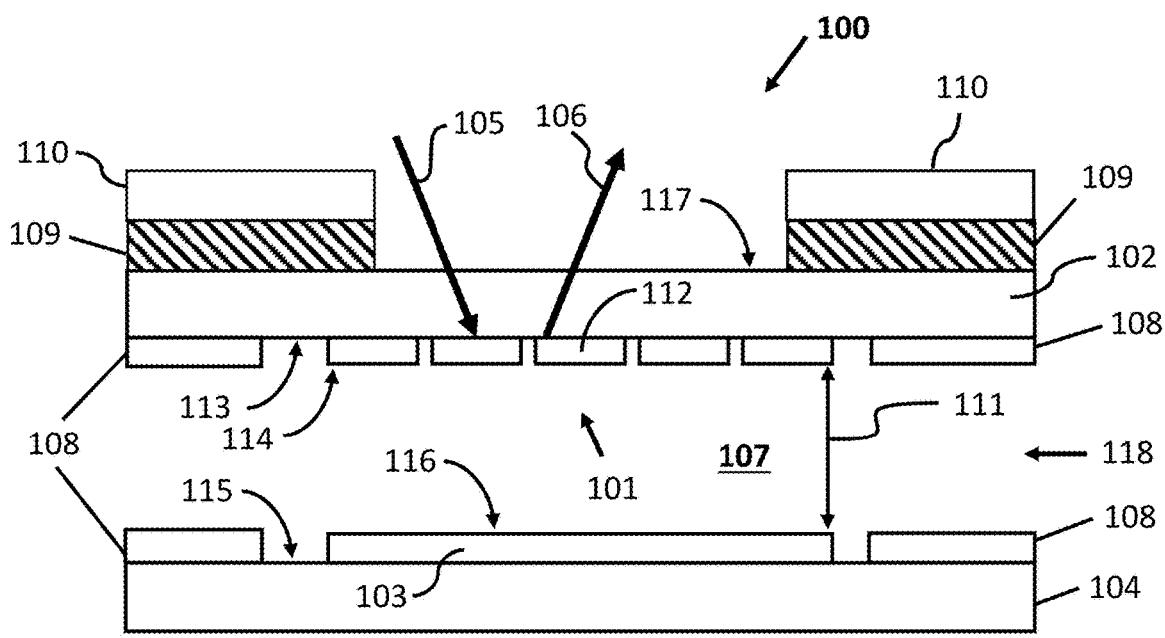

FIGS. 1A-1B schematically depict side views of embodiments of a reflection mode tunable notch filter 100. It is to be noted that not all elements depicted in FIGS. 1A-1E are required in every embodiment of tunable notch filter 100. Some of the elements depicted in FIGS. 1A-1E, and in other figures, are optional elements. Tunable notch filter 100 comprises transmissive substrate 102, antenna layer 101 positioned on gap-facing surface 113 of transmissive substrate 102 and mirror layer 103 positioned on gap-facing surface 115 of support substrate 104. In many embodiments antenna layer 101 and mirror layer 103 are substantially parallel and positioned across from and facing each other and are separated by gap 107, gap 107 having a gap distance 111. In FIGS. 1A-1B, antenna layer 101 comprises surface features 112 that are raised patches, and mirror layer 103 is a continuous layer of conductive material. In FIGS. 1A-1B five surface features 112 of antenna layer 101 are depicted and visible in the side views. Surface features 112 of antenna layer 101 extend distally from and perpendicular to gap-facing surface 113 and extend to antenna layer distal end 114 that faces mirror layer 103. In a similar fashion, mirror layer 103, which may be a continuous film as in these embodiments or which may comprise surface features 112 as described below, extends distally from and perpendicular to gap-facing surface 115 of support substrate 104 and extends to mirror layer distal end 116 that faces antenna layer 101. Gap distance 111 is the perpendicular distance between antenna layer distal end 114 and mirror layer distal end 116. In many embodiments, tunable notch filter 100 is tuned by adjusting gap distance 111. In some aspects, gap 107, may be filled with a fluid, i.e., gas or liquid, or may be a vacuum gap. As used herein the term "vacuum" can also mean "partial vacuum" where gas pressure is lower than atmospheric pressure. In many aspects gap 107 is part of inter-substrate region 118 that is the space separating transmissive substrate 102 and support substrate 104.

Gap 107 is the space between antenna layer distal end 114 and mirror layer distal end 116 in the region of the layers where surface features 112 in each layer are positioned across from one another and is the region where incident EMR 105 that enters notch filter 100 interacts with antenna layer 101 and mirror layer 103. In many embodiments, gap 107 is devoid of any structural entity, i.e., gap 107 between distal ends 114 and 116 is filled only with a fluid or is a vacuum.

EMR 105 that is incident on tunable notch filter 100 (incident EMR) is received at EMR entry surface 117 and passes through transmissive substrate 102, interacts with antenna layer 101 and mirror layer 103, and at least some of incident EMR 105 may be reflected (reflected EMR 106) or absorbed. Reflected EMR 106 exits notch filter 100 at an exit surface 401. In some embodiments, such as depicted here in FIGS. 1A-1B, entry surface and exit surface are the same surface 117 of transmissive substrate 102.

In some aspects, reflection of one or more selected wavelengths of incident EMR 105 can be selectively attenuated by reflection mode tunable notch filter 100, and the one or more selected wavelengths of incident EMR 105 whose reflection is selectively attenuated are absorbed by notch filter 100. As such, in many aspects reflected EMR 106 that exits notch filter 100 may be filtered EMR. In some aspects, reflected EMR 106 may be broadband EMR, i.e., no or very little incident EMR 105 is absorbed by notch filter 100. In many aspects, reflected EMR 106 that is broadband EMR is EMR whose reflection is not selectively attenuated. Whether a selected wavelength of incident EMR 105 is reflected or absorbed is determined in part by the tuning state of notch filter 100, which can be adjusted by adjusting gap distance 111. Other factors that may affect the tuning state of notch filter 100 and thus the absorption and reflection of EMR that enters notch filter 100 may include but are not limited to the composition, configuration, and conductivity of antenna layer 101 and mirror layer 103, the shapes, dimensions, spacing, and configuration of surface features 112 that may be part of antenna layer 101 and/or mirror layer 103, the angle of incidence of incident EMR 105, the roughness of surface features 112 and of substrates 102, 104, and the presence or absence of a fluid or vacuum in gap 107.

In the exemplary embodiments depicted in FIGS. 1A-1B transmissive substrate 102 having antenna layer 101 and support substrate 104 having mirror layer 103 are each associated with separate mechanical fixtures. In some embodiments then, antenna layer 101 and mirror layer 103 are not parts of an integrated structure, and thus can be assembled separately and held in position independently by separate mechanical fixtures.

In some aspects, tuning of reflection mode tunable notch filter 100 to a selected state may be accomplished by adjusting gap distance 111 with one or more than one gap-adjusting device. In some aspects, gap distance 111 may be adjusted by moving either transmissive substrate 102 or support substrate 104 or both transmissive substrate 102 and support substrate 104, such that the substrates move closer to or further from each other, thereby effecting the movement of one or both of antenna layer 101 and mirror layer 103 so that the layers move closer to or further from each other. In some aspects, it may be preferred that gap distance 111 be adjusted by moving support substrate 104 having mirror layer 103 positioned thereon while holding transmissive substrate 102 having antenna layer 101 positioned thereon in a fixed position. FIG. 1A shows an exemplary embodiment in which support substrate 104 is in contact with piezoelectric plates that function as gap-adjusting devices 109 and that are positioned on a single piezo mount 110. In some aspects, it may be preferred that gap distance 111 be adjusted by moving transmissive substrate 102 and antenna layer 101 while keeping support substrate 104 and mirror layer 103 in a fixed position. FIG. 1B shows an exemplary embodiment in which transmissive substrate 102 is in contact with piezoelectric plates that function as gap-adjusting devices 109 that are each positioned on a separate piezo mount 110. In some embodiments, each of transmissive substrate 102 and support substrate 104 can be positioned by using one or more than one gap adjustment device 109, and gap distance 111 may be adjusted by adjusting the position of both transmissive substrate 102 with antenna layer 101 positioned thereon and support substrate 104 with mirror layer 103 positioned thereon.

By adjusting gap distance 111 so as to tune notch filter 100 to a selected state, the spectral properties of reflected EMR 106 can be adjusted or changed. By adjusting gap distance 111, notch filter 100 can be tuned to selectively attenuate the reflection of some amount of one or more than one selected wavelengths or wavelength bands of incident EMR 105. In many aspects, the reflected EMR 106 resulting from this type of tuning is notched EMR, i.e., the spectral intensity of the one or more selected wavelengths or bands of EMR are significantly reduced in the reflected EMR 106. In these situations, a graphical plot of the relative intensity of reflected EMR 106 vs. wavelength exhibits a notch that represents a band of incident EMR 105 that is absorbed by tunable notch filter 100 when tuned to the selected state. In some aspects, gap distance 111 can be adjusted such that the reflection of very little or no incident EMR 105 is attenuated, and reflected EMR 106 is broadband radiation. That is, EMR across the entire spectral region of incident EMR 105 is reflected by the notch filter without selective attenuation of reflection.

In many aspects, when notch filter 100 is tuned by adjusting gap distance 111, the physical positioning of antenna layer 101 and mirror layer 103 are adjusted. A notch filter configured to selectively attenuate the reflection of at least one wavelength of incident EMR comprises antenna layer 101 and mirror layer 103 that have features and compositions selected for enabling the absorption of at least some incident EMR 105 by notch filter 100, resulting in the selective attenuation of reflection of at least one wavelength of EMR 105 incident on the notch filter.

Figure 1C:
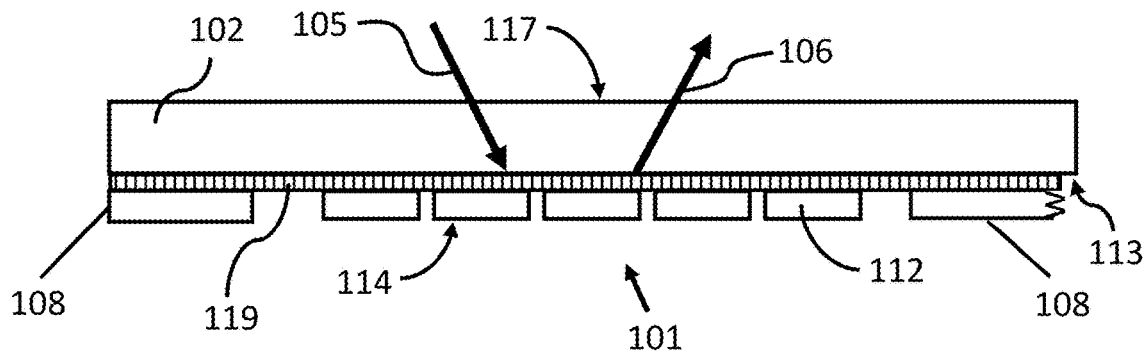
FIGS. 1C-1E are schematic side view representations of embodiments of a transmissive substrate having one or more antireflective surface treatments.
Figure 1D:
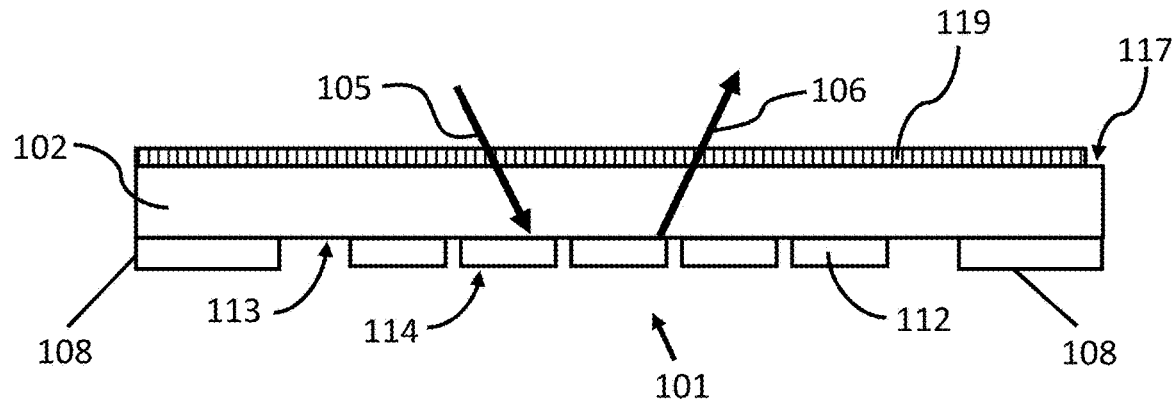
Figure 1E:
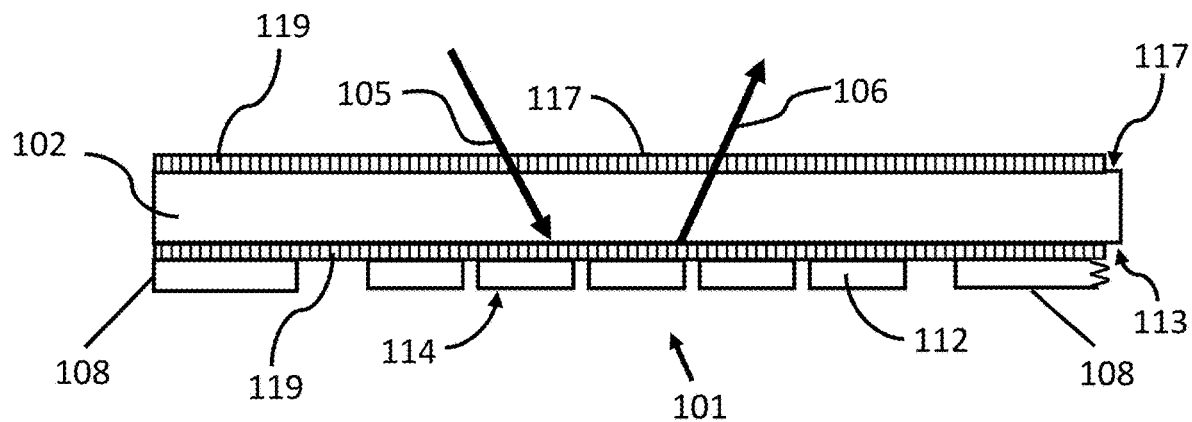

Transmissive substrate 102 may be or may comprise a wafer, a window, a lens, a prism, or any appropriate transparent structure that can be used as a substrate for antenna layer 101 and that can pass incident EMR 105 for interaction with antenna layer 101 and mirror layer 103. In some aspects transmissive substrate 102 may comprise at least one or more of ZnSe, Si, Ge, or $Al_2O_3$. In some aspects, transmissive substrate 102 may comprise any one of ZnSe, Si, Ge, and $Al_2O_3$ or may comprise any combination of any two or more of ZnSe, Si, Ge, and $Al_2O_3$. In some embodiments, transmissive substrate 102 may comprise an antireflective structure 119 (FIGS. 1C-1E), which in some aspects may be a coating on entry surface 117 (FIG. 1O) through which incident EMR 105 enters notch filter 100, on gap-facing surface 113 (FIG. 1D), or on both entry surface 117 and on gap-facing surface 113 (FIG. 1E). In some aspects, an antireflective structure 119 is an antireflective coating positioned on gap-facing surface 113 of transmissive substrate 102 such that at least part of the antiflective structure 119 is positioned between transmissive substrate 102 and antenna layer 101. In FIGS. 1C-1E, solely for ease of labeling elements 113 and 117, antireflective structure 119 is depicted as not extending all the way to the right side of transmissive substrate 102. In many embodiments, an antireflective coating will coat the entirety of entry surface 117 or gap-facing surface 113 or both surfaces 113 and 117. Transmissive substrates having antireflective structures or coatings are known in the art and are commercially available. The composition and/or features of transmissive substrate 102 may be selected so as to enhance the interaction of incident EMR 105 with notch filter 100 or to be useful for tuning notch filter 100 to one or more than one selected states for a selected application.

Figure 2B:
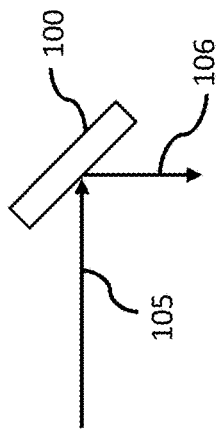
FIGS. 2A-2D schematically depict the reflection of selectively attenuated EMR by an embodiment of a tunable notch filter when tuned to a selected state.
Figure 2D:
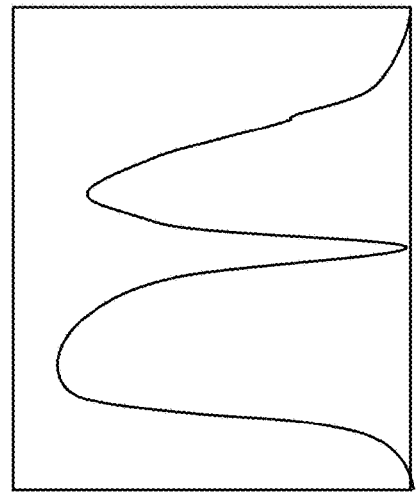
Figure 2A:
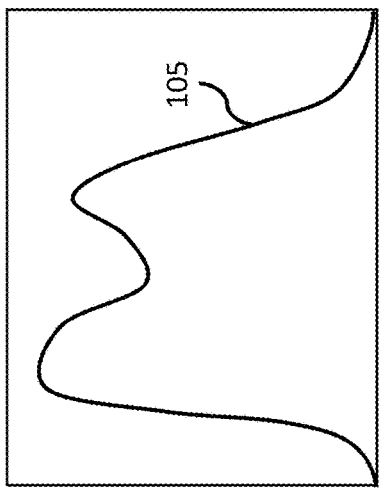
Figure 2C:
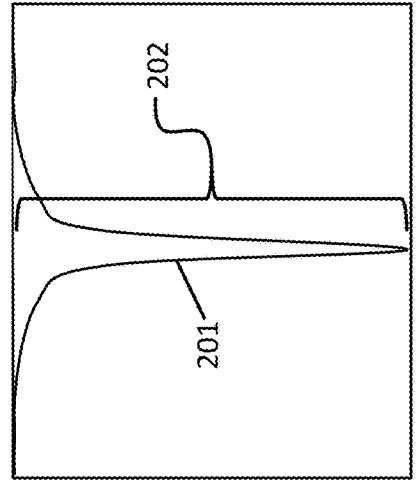

FIGS. 2A-2D schematically depict the reflection of EMR by tunable notch filter 100 when tuned to a selected state, wherein the reflection of some incident EMR 105 (i.e., at least one wavelength of incident EMR) is selectively attenuated. In this example, notch filter 100 is electronically tuned to a selected state so as to selectively attenuate the reflection of a single band of incident EMR 105 in a selected spectral region of EMR. Here, the intensity of EMR 105 in the selected spectral region of EMR that is incident on notch filter 100 is shown in FIG. 2A. The selected spectral region spans the arbitrary wavelength range shown in FIG. 2A. Incident EMR 105 interacts with notch filter 100 (FIG. 2B) and a portion of incident EMR 105 exits the notch filter as reflected EMR 106. FIG. 2C depicts the intensity of the EMR whose reflection is selectively attenuated by notch filter 100, referred to as a notch 201, that is, notch 201 is the band of EMR whose reflection is selectively attenuated by the selected tuning state of notch filter 100. In some aspects, EMR whose reflection is selectively attenuated may also be referred to herein as selectively attenuated EMR. A lower intensity of notched EMR in FIG. 2C corresponds to a lesser amount of reflected EMR 106 in the notch region of the EMR spectrum. A relatively wider band of radiation is present near the top of notch 201 in which reflection of incident EMR 105 is attenuated to a much lower relative extent, i.e., the intensity of reflected EMR 106 is relatively higher than that of EMR towards the center of notch 201 in which reflection of a relatively smaller band of EMR is reduced almost completely. The reflection of EMR in the region of notch 201 nearer to the center is greatly reduced compared to the EMR on either side of the deep region of notch 201. As used herein, the extent of attenuation of a band of EMR may be referred to as the notch "depth" 202. The band of attenuated EMR in FIG. 2C has a large notch depth 202 in that the intensity of the notched EMR (radiation that is absorbed by notch filter 100 and is not reflected) nearer to the center of notch 201 is much lower than the intensity of incident EMR 105 in the same narrow band nearer to the center of notch 201 (FIG. 2A). FIG. 2D portrays the intensity of reflected EMR 106 across the selected spectral region shown in FIG. 2A that is reflected by tunable notch filter 100 when tuned at this selected state. Reflection of incident EMR 105 that is in the band of notched radiation, i.e., in notch 201, is reduced relative to the reflection of incident EMR 105 that is outside of the spectral band that is notch 201. This is evident on comparison of FIG. 2A with FIG. 2D. In many aspects, notch 201 represents that spectral band of incident EMR 105 that is selectively absorbed to at least some extent by notch filter 100, i.e., the EMR which is not reflected by notch filter 100 when the notch filter is tuned to a selected state. In some aspects, notch filter 100 can be configured and tuned to retain its wavelength-selective attenuating capacity over a broad range of incident angles. In some aspects, for incident EMR 105 arriving from incident angles of up to about 60° the shape and depth of notch 201 is consistent. In some embodiments, selectively attenuating the reflection of a wavelength or a wavelength band by notch filter 100 means that reflection of the incident EMR of the selected wavelength or wavelength band is reduced by an amount that is >0% up to 100%.

In some embodiments, tunable notch filter 100 is broadly tunable and configurable, that is it can be tuned so as to be capable of selectively attenuating the reflection of EMR in a wide range of wavelengths, e.g. wavelengths that are about +/−35% of a center wavelength, thereby enabling the use of the filter over a range that can span an octave or more on the electromagnetic spectrum. In some embodiments, a notch filter 100 can be tuned to selectively attenuate the reflection of a wavelength of EMR that is present anywhere within a region that is a selected octave on the electromagnetic spectrum. In some embodiments, a notch filter 100 can be tuned to selectively attenuate the reflection of a wavelength band of EMR whose center wavelength is positioned anywhere within a region that is a selected octave on the electromagnetic spectrum. By way of example only, in some embodiments notch filter 100 can be tuned to selective attenuate the reflection of a wavelength or a wavelength band whose center wavelength is present anywhere in a spectral region from about 350 nm to about 700 nm, from about 0.75 μm to about 1.5 μm, from about 1 μm to about 2 μm, or from about 6 μm to about 12 μm. In some aspects, the region that spans an octave can be in any region of the electromagnetic spectrum. In some aspects, the octave-spanning region can be in a region that includes some or all of the UV and VIS regions, in the IR region, in the THz region, or partially in one region and partially in an adjacent region. In some aspects the octave-spanning region can be in a region of the EMR spectrum that includes some or all of the LWIR and THz regions.

For tuning notch filter 100, gap distance 111 can be adjusted using any of a variety of gap-adjusting devices 109. Tunable notch filter 100 may comprise a single device or any combination of a plurality of gap-adjusting devices 109 that operate by one or more than one mechanisms. In some embodiments, a gap-adjusting device 109 may be for example a mechanical device such as a micrometer, an electromechanical device such as for example a piezoelectric device or a capacitive comb drive, an electromagnetic device such as for example a solenoid or a magnetostrictive material. By way of example only, notch filter 100 may comprise two or more piezoelectric devices that are gap-adjusting devices 109 as in the embodiments shown in FIGS. 1A-1B, or a notch filter may comprise gap-adjusting devices 109 that include a micrometer and a capacitive comb drive. In some aspects, a notch filter 100 comprises one or more than one gap-adjusting device 109 that is electrostatically driven. A plurality of gap-adjusting devices can be useful for accurately controlling and maintaining gap distance 111 at a plurality of locations across antenna layer 101 and mirror layer 103. By way of further example, a plurality of three or more piezoelectric devices or other type or types of appropriate gap-adjusting devices 109 can be used to maintain gap distance 111. In some aspects, a plurality of gap-adjusting devices 109 can be used to for both coarse adjustment, when the gap distance 111 distance is relatively larger and precise measurements are less critical, and for more fine adjustments, when the desired gap distance is relatively smaller or when more precisely fine tuning of the gap distance is desired. In some embodiments, a notch filter may comprise a gap-adjusting device 109, useful for coarse adjustment, that is capable of adjusting gap distance by an amount that is at least about 4 μm.

In some embodiments, a gap-adjusting device 109 may comprise an element that is external to notch filter 100. FIGS. 3A-3B. depict an exemplary embodiment of tunable notch filter 100 in which electrostatic drive electrodes 302, are positioned adjacent to and in contact with transmissive substrate 102 and support substrate 104 and are in electrical communication with a voltage source that is external to notch filter 100. In some embodiments, such as that depicted in FIGS. 3A-3B, one or more than one gap-adjusting devices may be positioned in intersubstrate region 118. The notch filter 100 embodiment depicted in FIGS. 3A-3B is also an example of a tunable notch filter that is an integrated mechanical fixture such that substrates 102 and 104, antenna layer 101, and mirror layer 103 are part of a single wafer 301. In some aspects one or both of transmissive substrate 102 and support substrate 104 may be positioned on or be in contact with one or more than one flexible element 303, such as by way of example only, one or more than one beam or cantilever or other structure that can function as a gap-adjusting device 109 and that can effect movement or flexure of a substrate thereby enabling adjustment of gap distance 111 and filter tuning. In this exemplary embodiment, support substrate 104 is positioned to be in contact with flexible elements 303 that are beams. Voltage applied to one or more than one of drive electrodes 302 can induce bending of one or more than one of flexible elements 303 (FIG. 3B) thereby moving support substrate 104. In some aspects, one or more than one electrostatic drive electrodes 302 may function as capacitive distance sensors.

Gap distance 111 may be monitored simultaneously with adjustment of the gap distance. In some aspects, to enhance accuracy during adjustment of gap distance 111 and during maintenance of gap distance 111, gap distance may be monitored explicitly. A tunable notch filter 100 may comprise one or more gap distance sensors 108 that can be used for monitoring gap distance 111. In some aspects, a plurality of gap distance sensors 108 that employ a single type of sensing mechanism or a plurality of sensing mechanisms can be useful for monitoring gap distance 111. The exemplary notch filter 100 depicted in FIG. 1A comprises two gap distance sensors 108, each sensor positioned in intersubstrate region 118 and comprising a pair of pads, one pad in each sensor being on transmissive substrate 102 and one pad in each sensor being on support substrate 104. One or more than one gap distance sensor 108 may be positioned on transmissive substrate 102, on support substrate 104, or on both substrates and at any selected location that allows for gap distance sensing. Some methods for explicit monitoring include using interferometric measurement. Additional methods for explicit monitoring include using one or more gap distance sensors that can include capacitive proximity sensors, Hall effect sensors, and optical cantilevers. In some embodiments, capacitance between antenna layer 101 and mirror layer 103 can be measured and layers 101 and 103 function as a gap distance sensor such that a separate distance sensor 108 is not a requirement.

In some embodiments, methods for monitoring gap distance 111 may include using a gap distance sensor 108 having an external element such as for example a distance monitor, which can be useful during adjustment of gap distance 111. External monitoring methods can also be useful for inferring gap distance 111, for example when the expected distance is relatively larger such as during coarse displacement when precise measurements are less critical. External monitoring methods may employ by way of example only a laser, a piezoresistive mechanism, optical triangulation, a differential transformer, interferometric methodology, electric or magnetic induction, or any combination of these examples including combinations having a plurality of any of the examples.

In many aspects, notch filter 100 may operate in a closed-loop feedback mode in which gap distance 111 is monitored and measured during operation of tunable notch filter 100, and based on one or more measurements, gap distance 111 can be adjusted so as to achieve a selected gap distance and tuning state. In some aspects, notch filter 100 may operate in a partially closed-loop feedback mode, such that during multiple tunings of notch filter 100, gap distance 111 is monitored and measured for a subset of the multiple tuning states.

In some aspects, gap distance 111 can be adjusted to be from about 1 nm to about 10 μm, from about 5 nm to about 500 nm, from about 5 nm to about 100 nm, from about 10 nm to about 100 nm, from about 10 nm to about 50 nm, from about 10 nm to about 15 nm, from about 1 nm to about 10 nm, from about 15 nm to about 100 nm, from about 15 nm to about 50 nm, from about 15 nm to about 25 nm, from about 30 nm to about 300 nm, and from about 50 nm to about 200 nm. Gap distance 111 can be adjusted to be within any of these recited ranges or may be adjusted to be a shorter or larger distance provided that there is separation between antenna layer distal end 114 and mirror layer distal end 116, i.e., provided that antenna layer 101 and mirror layer 103 are not in contact.

In some embodiments a notch filter may be configured such that gap distance 111 is adjustable in a size range from about 10 nm to about 100 nm. In some aspects, a notch filter may be configured such that gap distance 111 is adjustable in a size range from about 30 nm to about 300 nm. In some aspects, a notch filter may be configured such that gap distance 111 is adjustable in a size range from about 50 nm to about 200 nm.

FIGS. 4A-4F show exemplary embodiments in which transmissive substrate 102 is a prism. In the embodiments depicted in FIGS. 4A-4F, incident EMR 105 enters notch filter 100 at entry surface 117 of transmissive substrate 102, and interacts with antenna layer 101 and mirror layer 103. In some aspects, a transmissive substrate that is a prism can be useful for reducing the angle of incidence of EMR 105 that arrives at and interacts with antenna layer 101/mirror layer 103. In some embodiments, a prism useful as transmissive substrate 102 may be configured as a penta prism, a displacement-doubling prism, a half-penta prism, a delta prism, or a Littrow prism.

Figure 4A:
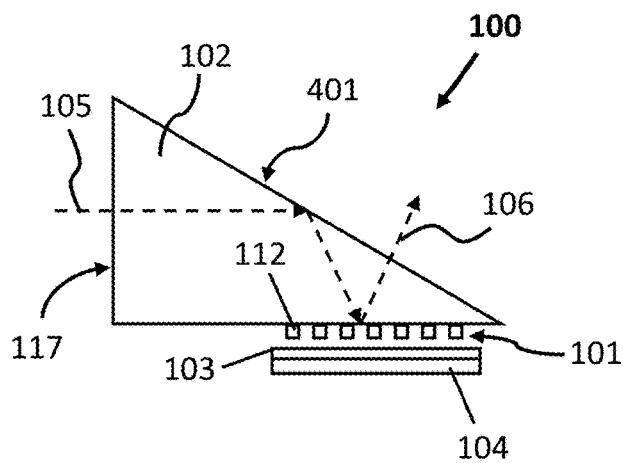
FIGS. 4A-4F schematically depict side view representations of embodiments of a tunable notch filter in which the transmissive substrate is a prism.

The arrow in FIG. 4A that is 101 indicates antenna layer 101 having seven surface features 112 visible in this side view. For ease of viewing, the corresponding structures may not all be labeled in FIGS. 4B-4F. A person having ordinary skill in the art will recognize the corresponding structures 101, 112 in FIGS. 4B-4F from the teachings in the specification. In some embodiments (by way of example FIGS. 4A-4E) some of the incident EMR 105 is reflected by notch filter 100 and exits the filter at exit surface 401 of notch filter 100. In some aspects, a notch filter 100 having a prism as a transmissive substrate 102 may be configured such that at least some incident radiation 105 entering the notch filter is reflected within the transmissive substrate 102 prior to interacting with antenna layer 101 and mirror layer 103 (e.g., FIGS. 4A, 4D, 4E). Dashed lines represent exemplary possible paths of EMR reflection within a transmissive prism substrate 102 prior to and after entering notch filter at entry surface 117 and after exiting notch filter 100.

Figure 4B:
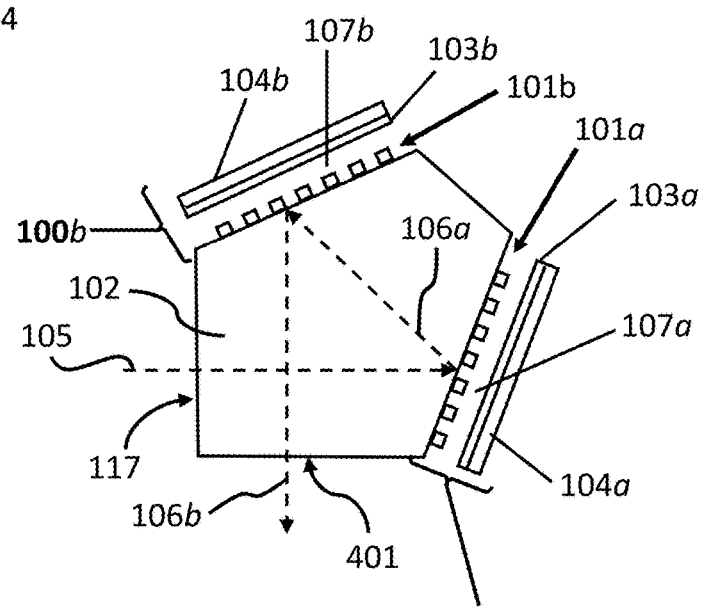
Figure 4C:
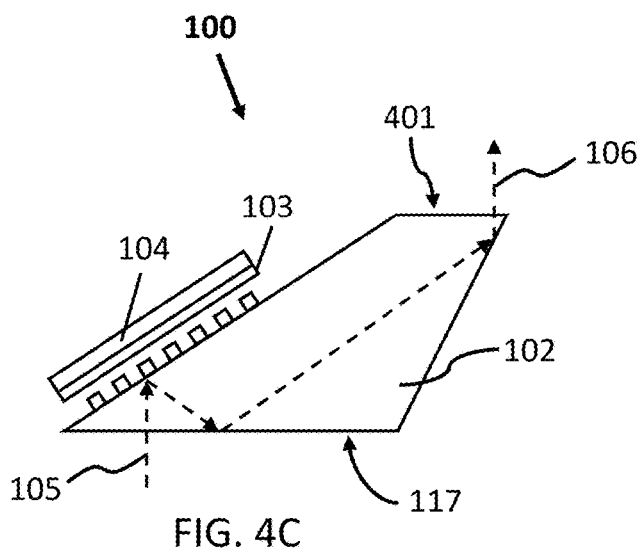
Figure 4D:
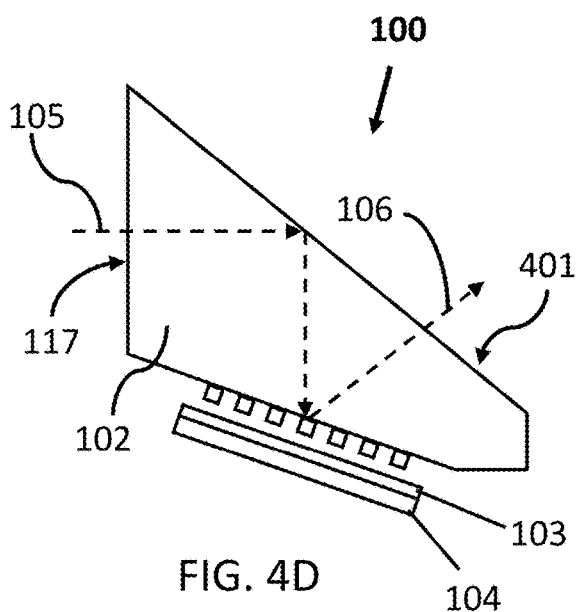
Figure 4E:
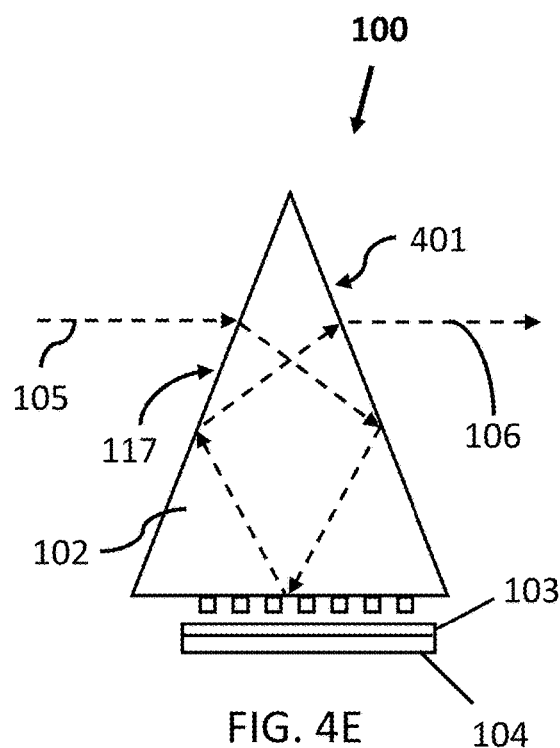
Figure 4F:
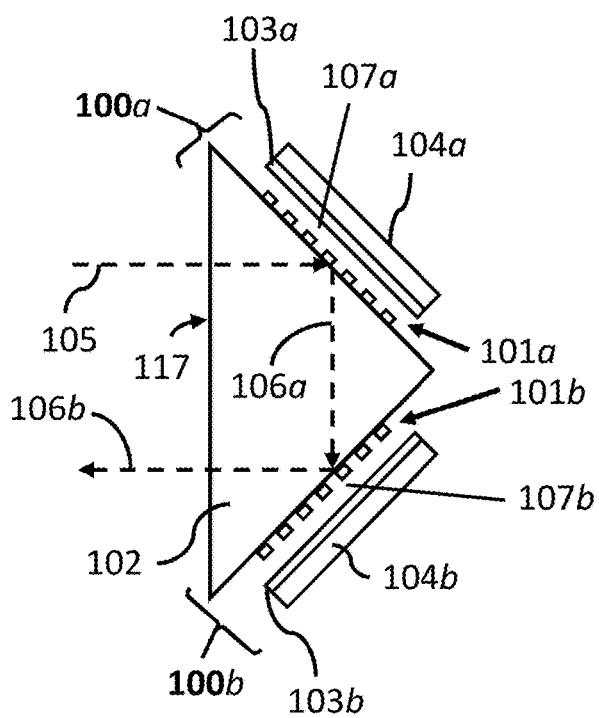

The embodiments depicted in FIGS. 4B and 4F comprises two antenna layers 101 (101a, 101b), the layers being positioned on separate surfaces of transmissive substrate 102. Opposite each antenna layer is a mirror layer 103 (103a, 103b) each mirror layer positioned on a support substrate 104 (104a, 104b) and across gap 107 (107a, 107b). In these embodiments, each assembly of 101, 103, 104 positioned at different locations on the same transmissive substrate 102 function with the transmissive substrate as a distinct notch filter 100, such that the structures in FIGS. 4B and 4F comprise a plurality of notch filters 100 (100a, 100b). Incident EMR 105 is directed by transmissive substrate 102 that is a prism to a first notch filter 100a, where first reflected EMR 106a is reflected and passed by first notch filter 100a through transmissive substrate 102 to a second notch filter 100b where second reflected EMR 106b is reflected and passed by second notch filter 100b through transmissive substrate 102 and exits at exit surface 401 in the case of the embodiment shown in FIG. 4B or at entry surface 117 in the case of the embodiment shown in FIG. 4F. In the embodiment in FIG. 4F, entry surface 117 also functions as an exit surface for reflected EMR 106b. In some aspects, one or both of entry surface 117 and exit surface 401 may be non-linear surfaces or curved surfaces. In some embodiments then, EMR 106a reflected by a first notch filter 100a may be EMR that is reflected or directed in such a manner as to be EMR that is incident on a second notch filter 100b.

In some embodiments, such as those shown in FIGS. 4B and 4F, a plurality of tunable notch filters 100 (e.g., 100a, 100b) for EMR comprise a first tunable notch filter 100a, the first tunable notch filter comprising a first antenna layer 101a positioned on a first region of a transmissive substrate 102, the transmissive substrate 102 being a prism, and a first mirror layer 103a positioned on a first support substrate 104a, wherein the first antenna layer 101a and the first mirror layer 103a are positioned on opposite sides of a first gap 107a and facing each other, the first gap having a first gap distance 111 (not labeled here for ease of viewing, but corresponding to 111 in FIGS. 1A, 1B and in FIGS. 3A, 3B); and a second tunable notch filter 100b, the second tunable notch filter comprising a second antenna layer 101b positioned on a second region of the transmissive substrate 102 prism and a second mirror layer 103b positioned on a second support substrate 104b, wherein the second antenna layer 101b and the second mirror layer 103b are positioned on opposite sides of a second gap 107b and facing each other, the second gap having a gap distance 111, and wherein the first notch filter 100a is tunable by adjusting the gap distance 111 of first gap 107a and the second notch filter 100b is tunable by adjusting the gap distance 111 of second gap 107b. In these embodiments, the first and second tunable notch filters share a transmissive substrate 102 that is a prism. In some aspects, wherein two notch filters share a transmissive prism substrate 102 the first tunable notch filter may be configured to selectively attenuate the reflection of EMR having a first polarization state and the second tunable notch filter may be configured to selectively attenuate the reflection of EMR having a second polarization state.

Support substrate 104, which supports mirror layer 103, may be a transmissive support substrate or may be a non-transmissive support substrate. Exemplary substrate materials include, among others, silicon, glass, sapphire, steel, and aluminum. In some aspects, support substrate 104 is rigid so as to reduce or prevent bending of mirror layer 103. In many aspects it is preferred that transmissive substrate 102 and support substrate 104 be sufficiently flat so that antenna layer 101 and mirror layer 103 across gap 107 are substantially parallel to each other.

In some embodiments, transmissive substrate 102 and support substrate 104 need not be substantially parallel across all of intersubstrate region 118. For example in some aspects, transmissive substrate 102 and support substrate 104 may be substantially parallel in the region of gap 107, but not necessarily substantially parallel in one or more areas of intersubstrate region 118 that are outside of gap 107. In some aspects, substrates 102 and 104 may be shaped differently in one or more areas of intersubstrate region 118 outside of gap 107.

Antenna layer 101 is typically positioned on gap-facing surface 113 of transmissive substrate 102, and mirror layer 103 is positioned on gap-facing surface 115 of support substrate 104. In some aspects, one or both of antenna layer 101 and mirror layer 103 may be or may comprise a continuous layer of conductive material. In some aspects, one or both of antenna layer 101 and mirror layer 103 may comprise a plurality of layers of material.

In some embodiments, one or both of antenna layer 101 and mirror layer 103 may be or may comprise one or more than one surface features 112 that may be for example one or more than one strip, one or more than one patch, or any combination of one or more than one strips and one or more than one patches. In some aspects, a strip and/or a patch may be a raised structure, i.e., a strip or patch may extend some distance measured perpendicularly from gap-facing surface 113 of transmissive substrate 102 or from gap-facing surface 115 of support substrate 104. In many aspects, surface features 112 are discrete structures positioned on a substrate (102, 104). In these aspects, an assembly of discrete surface features 112 are considered to be or be part of antenna layer 101 or mirror layer 103. In some aspects, a surface feature 112 may be a raised area of a continuous film that is antenna layer 101 or mirror layer 103, which may be useful in aspects when it is desirable to have a residual conducting plane for electrically connecting a plurality of surface features 112. In some aspects, a surface feature 112 may be an aperture present in an otherwise continuous film of conductive material.

Surface features 112 can be any of a variety of shapes or configurations useful for generating resonances of EMR. Exemplary shapes include ellipses, circles, arcs, rectangles, squares, annular shapes, bow-ties, triangles, polygons, X-shapes, cross shapes, and other complex and random shapes. Surface features may also be open structures such as open rings, open rectangles, or open polygons. In some aspects, a surface feature may have a shape that is a combination of different shapes. In some aspects, surface features 112 may be curved or variously structured antennas that are field-enhancing features and useful, by way of example only, for eliminating harmonics and/or for reducing reflection of at least some incident EMR 105. In many aspects, discrete surface features 112 are structures that may be any shape or any combination of shapes, such as but not limited to the examples listed above.

Surface features 112 that are not apertures may comprise electrically conductive materials. A wide array of antenna materials including metals, ceramics, semiconducting materials, and mixtures thereof that are useful for making tunable absorptive surface elements are known to those having skill in the art. In many aspects, a surface feature 112 that is an electrically conductive feature may be a relatively flattened structure such as those depicted in FIGS. 1A and 1B and FIG. 3 or may be a relatively taller feature having a height that is greater than its width or diameter or other lateral dimension.

In some aspects, antenna layer 101 and/or mirror layer 103 may comprise a plurality of layers of materials. In many aspects, an individual surface feature 112 may comprise a plurality of layers of conductive materials. One or more than one of a plurality of discrete surface features may comprise a plurality of layers of conductive material. Antenna layer 101 and mirror layer 103 configured in this manner may be useful, by way of example only, for increasing notch depth 202 (i.e., reducing reflection of a selected band or notch of incident EMR), increasing notch width, and selecting for the reflection of circularly or elliptically polarized light.

In many aspects, the numbers of surface features 112 of antenna layer 101 and/or mirror layer 103 may be in the thousands, millions, or more. A plurality of discrete surface features 112 may be configured as an ordered array or may be otherwise configured, e.g., randomly positioned. The dimensions of an assembly or array of surface features 112 can be any dimensions provided that the array fits on a substrate and allows room for other structures that may be part of notch filter 100, such as for example electrodes (e.g., 302), gap distance sensors 108, and the like. In some aspects, antenna layer 101 and/or mirror layer 103 may comprise surface features 112 that are grouped into separate arrays that may have different dimensions and configurations or that may have approximately equal dimensions and the same configurations. In many embodiments, distal end 114 of antenna layer 101 and distal end 116 of mirror layer 103 are substantially parallel. However, in some aspects, distal ends 114 and 116 are not substantially parallel. For example gap 107, may be slightly larger at one side than at an opposing side or in another area of gap 107.

The attributes of surface features 112 of antenna layer 101 and mirror layer 103 can be selected so as to enable the tuning of notch filter 100 to a selected state of tuning. The structure and composition of antenna layer 101 and mirror layer 103, the presence or absence of a fluid or vacuum in gap 107, and gap distance 111 can all contribute to the tunability of notch filter 100 thereby affecting the spectral properties of reflected EMR 106 during operation of the filter. Adjustment of gap distance 111 is an active method that can be used to tune a notch filter 100 made with selected materials and having a selected conformation.

Figure 5A:
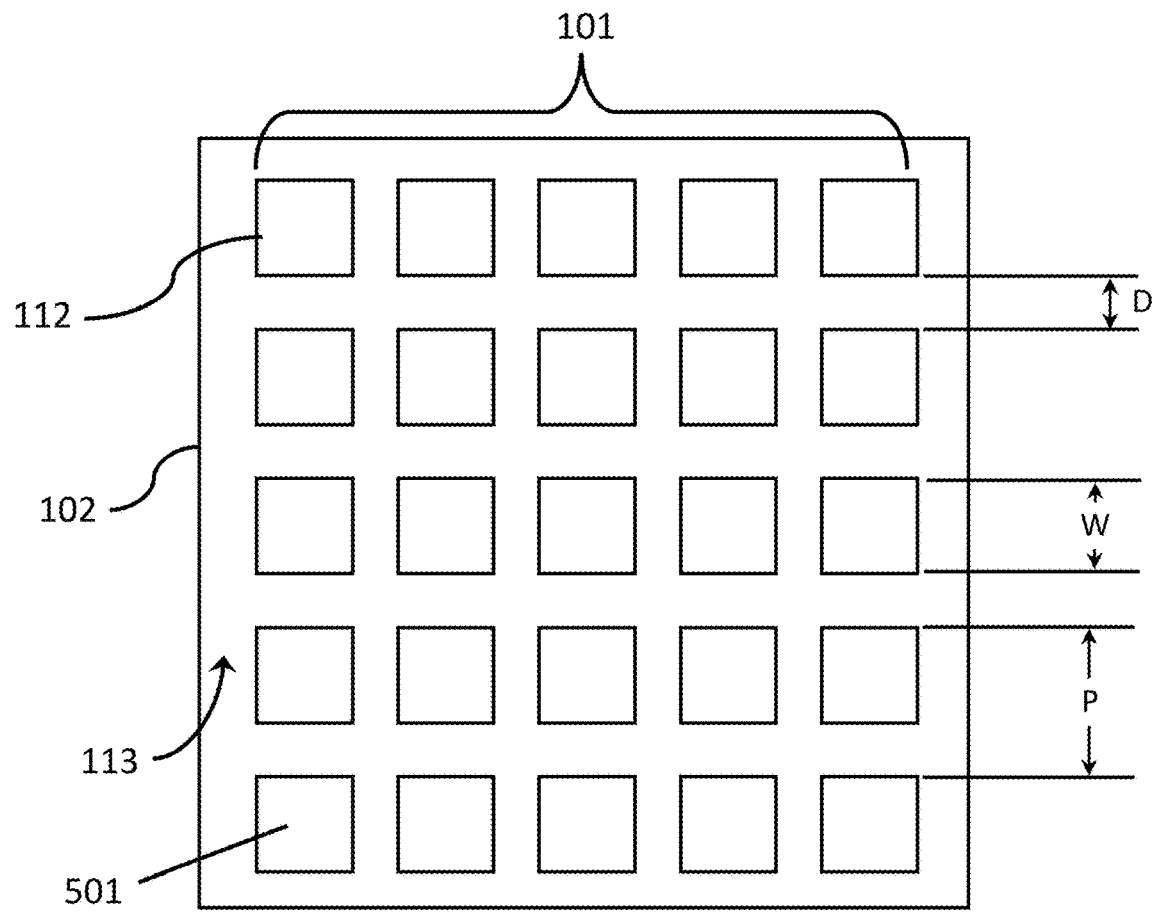
FIGS. 5A-5B schematically depict an embodiment of a notch filter and dimensions of selected features.
Figure 5B:
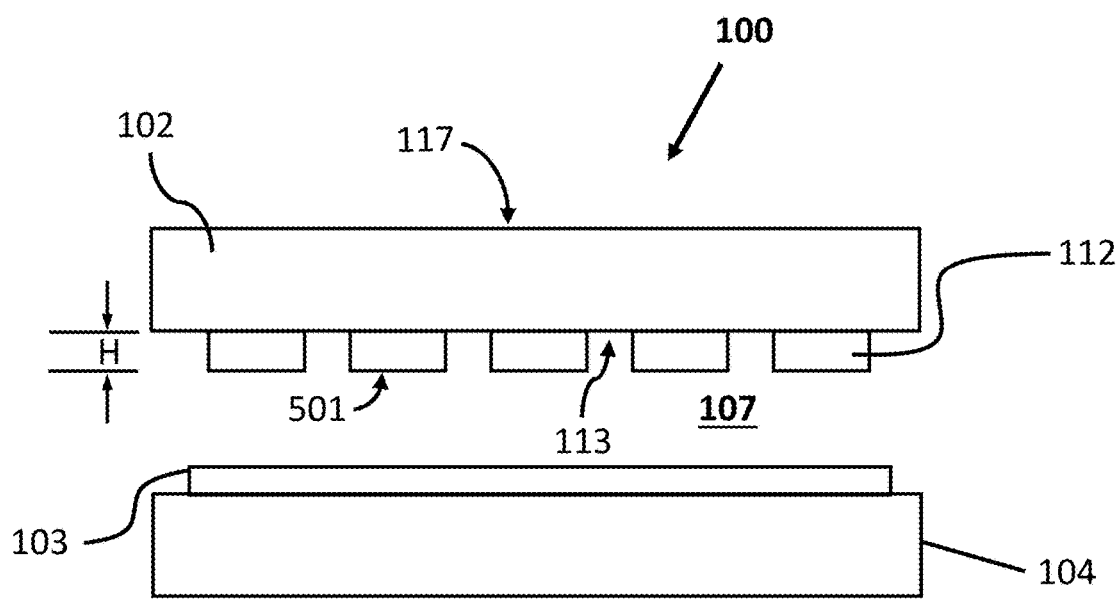

FIGS. 5A-5B schematically depict a notch filter 100 and exemplary antenna layer 101 with dimensions of selected features of the notch filter being defined. Here, antenna layer 101 is an example of a polarization-independent configuration, i.e., EMR 106 is reflected regardless of the polarization state of incident EMR 105. FIG. 5A shows a top-down schematic view of an exemplary format for antenna layer 101 comprising discrete, electrically conductive surface features 112 on transmissive substrate 102. The view is looking downward on and perpendicular to "tops" 501 of surface features 112 and toward transmissive substrate 102. For purposes of description herein, the "top" 501 of a surface feature refers to that face or part of a surface feature 112 that faces the layer (101 or 103) positioned across gap 107 from the surface feature being referenced. In general, tops 501 of surface structures 112 on antenna layer 101 correspond to distal end 114 of the antenna layer, and tops 501 of surface structures 112 on mirror layer 103 correspond to distal end 116 of the mirror layer. For example, FIG. 5B shows a side view of surface features 112 positioned on transmissive substrate 102 and having tops 501. In this example, surface features 112 are square conductive metal patches, all with the same dimensions and positioned on gap facing surface 113 of transmissive substrate 102 in a 5×5 ordered array with uniform spacing between the patches. The width (W) of an individual square surface feature 112, the pitch (P) of adjacent surface features, and the separation distance (D) between surface features are indicated in FIG. 5A. In some aspects the width of a surface feature may be a diameter of a circular feature. As shown in FIG. 5B, in this embodiment surface feature height (H) is the distance that a discrete surface feature 112 extends from gap-facing surface 113 of transmissive substrate 102 measured perpendicular to gap-facing surface 113. In this configuration, mirror layer 103 is a continuous layer of conductive metal.

In many embodiments, the height or thickness of antenna layer 101 and/or mirror layer 103 corresponds to the maximum height of a surface feature 112 that is in the respective layer. In some aspects, the height or thickness of a layer 101 or 103 is the height of a continuous layer of material. The height or thickness of a layer, like the height of a surface feature 112 is measured perpendicularly from the gap facing side of the corresponding substrate 102 or 104 to the top of the surface feature 112 with the greatest height. In some aspects, mirror layer thickness may be from at least about 10 nm or one skin depth, whichever is greater, up to a height at which mirror layer 103 and antenna layer 101 remain not in contact with each other. The skin depth for selected metals, in a wavelength range of interest, can be found or determined by a person having ordinary skill in the art (e.g., Cuadrado et al., 2012, Proc. of SPIE Vol. 8457: 845724-1). In some embodiments, antenna layer 101 or mirror layer 103 or both antenna layer 101 and mirror layer 103 may comprise metals such as for example Au, Cu, or Ag or any combination of these. In some aspects, either or both of the antenna layer and the mirror layer comprise at least one of Au, Cu, or Ag.

Surface features 112 present in one or both of antenna layer 101 and mirror layer 103 can be any of a variety of features, which are selected for making a notch filter having a desired repertoire of properties and functionalities for use in various aspects. In some aspects, one or both of antenna layer 101 and mirror layer 103 may comprise surface features having substantially the same shapes and sizes or may comprise surface features having different shapes and sizes, which in some aspects may be part of a single array of surface features or a plurality of surface feature arrays. In some aspects, one or both of antenna layer 101 and mirror layer 103 may comprise both surface features that are apertures and surface features that are patches. In some aspects, surface features 112 having selected shapes and sizes may be grouped into separate arrayed regions that occupy different regions on antenna layer 101 and/or mirror layer 103. The shapes and sizes of surface features in one array may be different from the shapes and sizes of surface features in a different array. In some aspects, one of antenna layer 101 and mirror layer 103 or both layers may each comprise surface features that have different dimensions and shapes. In some aspects the distance separating surface features (i.e., the pitch of a group of surface features) can be adjusted and may even be variable and will be based on the desired function of notch filter 100.

In some embodiments, a notch filter 100 for use in absorbing EMR in the LWIR region of the spectrum may comprise surface features 112 having widths of a micrometer ($\mu$m) or larger, a notch filter 100 for use in absorbing EMR in the MWIR region of the spectrum may comprise surface features having widths in the hundreds of nanometers, and a notch filter 100 for use in absorbing EMR in one or more than one of the VIS, NIR, or SWIR region of the spectrum may comprise surface features having widths in the tens of nanometers. However, these are not meant to be considered as strict limits. In some aspects, a notch filter 100 may comprise different regions, each region having surface features 112 with widths in a selected size range that can be different from the size range of surface features widths present in a different region of the filter. In some aspects, a notch filter 100 may comprise surface features 112 having a variety of different widths and that are positioned and configured to interact with different wavelengths of incident EMR 105 that pass through transmissive substrate 102.

A wide variety of techniques known in the art of semiconductor and antenna fabrication may be used for making surface features and for forming and otherwise modifying antenna layer 101 and mirror layer 103. Such techniques include but are not limited to deposition, printing, patterning, physical and chemical etching, ablation, thin film techniques, release, lithographic processing, imprinting, and the like. In many embodiments, operation of notch filter 100 is not sensitive to the techniques used for fabrication, as long as selected material characteristics, dimensions, and positioning of components can be achieved and maintained.

FIGS. 6A-6D depict top-down schematic views of exemplary different surface features 112 that may be useful as part of antenna layer 101. The view for each of FIGS. 6A-6D is looking downward on and perpendicular to tops 501 of surface features 112 and toward gap-facing surface 113 of transmissive substrate 102. The exemplary embodiments depicted here are described in the context of antenna layer 101, however these exemplary arrangements, types, and shapes of surface structures are not exclusive to antenna layer 101, and in some aspects the arrangements, types, and shapes depicted in FIGS. 6A-6D can also be useful for surface features 112 that are in mirror layer 103.

In many aspects, surface features 112 for use with antenna layer 101 and mirror layer 103 may be configured as one or more than one arrays, as is shown for the exemplary layers in FIGS. 6A-6D. The exemplary array configurations and sizes shown in FIGS. 6A-6D are for descriptive purposes. In many aspects, antenna layer 101 or mirror layer 103 may comprise thousands of surface features 112 that can be configured as one or more than one array. By way of example only, antenna layer 101 may comprise an array of surface features that is about a 1×500 array, about a 1×5,000 array, about a 500×500 array, or a 5,000×5,000 array or an array having millions of surface features or may comprise a plurality of arrays each having the same dimensions or a plurality of arrays wherein the arrays have different dimensions from one another. In some aspects, the number of surface features in antenna layer 101 or mirror layer 103 can be even greater. Surface features 112 may be positioned into a single array or a plurality of arrays, the arrays having any selected dimensions. In some embodiments, an array of surface features comprises at least four features patterned as a 2×2 ordered array or as a 1×4 array. Surface features 112 in antenna layer 101 or mirror layer 103 need not be configured into an ordered array and may be randomly positioned.

In some aspects, a notch filter 100 comprising an antenna layer 101 of surface features 112 configured as an array similar to those shown in any of FIGS. 6A-6D and having surface features 112 with one or more than one of the shapes shown may be particularly useful with a notch filter 100, having mirror layer 103 that is a continuous conductive film, for selectively attenuating reflection of at least one wavelength of incident EMR 105. For example, antenna layer 101 that can be useful with a mirror layer 103 that is a continuous conductive film may comprise a rectangular array, a square array, or an array that is not configured as a rectangle or square, or any combination of these arrays so configured, and each array may comprise one or more than one shape of surface features, including by way of example only, surface features that are square patches, rectangular patches, or open circles.

Figure 6A:
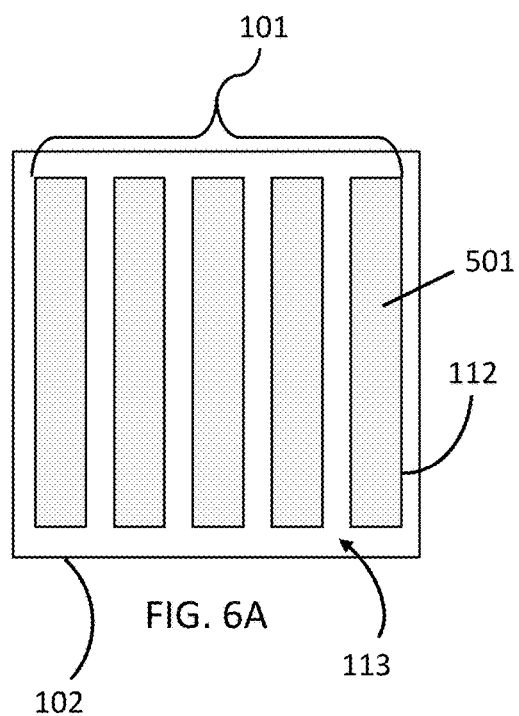
FIGS. 6A-6D depict top-down schematic views of surface feature patterns for embodiments of a notch filter antenna layer.

FIG. 6A shows an antenna layer 101 comprising five surface features 112 that are metal strips having essentially the same size and shape and positioned on gap-facing surface 113 of transmissive substrate 102. Antenna layer 101 comprising a linear 1×N array of metal strips, such as in the exemplary configuration shown in FIG. 6A may be useful for reflection of EMR in a polarization-dependent manner. In the example of FIG. 6A, antenna layer 103 functions as a mirror for reflecting incident EMR 105 with a polarized electric field parallel to the long-axis of the surface features 112 and functions to selectively attenuate the reflection of incident EMR 105 having a polarized electric field perpendicular to the long-axis of the metal strip surface features 112. In some aspects, an array of metal strip surface features for polarization-dependent reflection of EMR can be configured as any size array up to about a 1×5,000 array or even a larger array. A notch filter 100 comprising antenna layer 101 configured as a 1×N array of metal strips and comprising a mirror layer 103 that is a continuous layer of conductive material can be useful for selectively attenuating the reflection of at least one wavelength of incident EMR in a polarization-dependent manner. In some aspects, a notch filter configured for selectively attenuating the reflection of at least one wavelength of incident EMR in a polarization-dependent manner is configured for selectively attenuating the reflection of at least one wavelength of incident EMR having at least one polarization state.

Figure 6B:
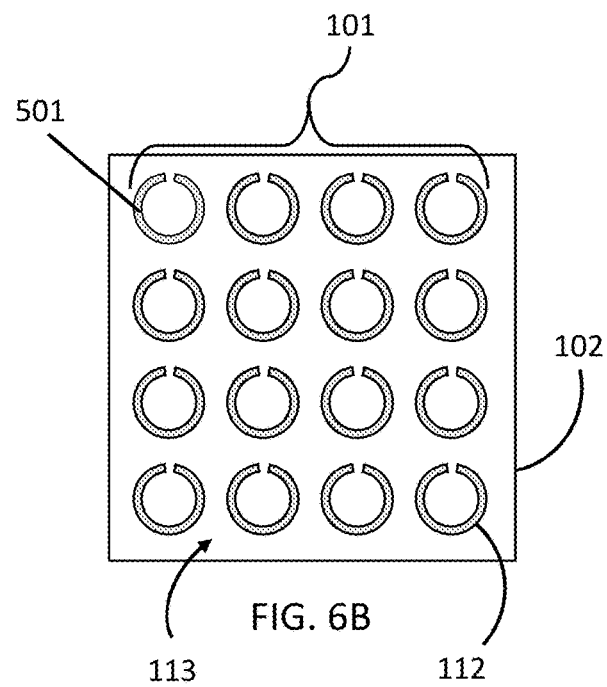

FIG. 6B shows an antenna layer 101 comprising an ordered array of surface features 112 positioned on gap-facing surface 113 of transmissive substrate 102. In this exemplary embodiment, the surface features 112 are metal patches having open-ring shapes, all having essentially the same size and shape.

Figure 6C:
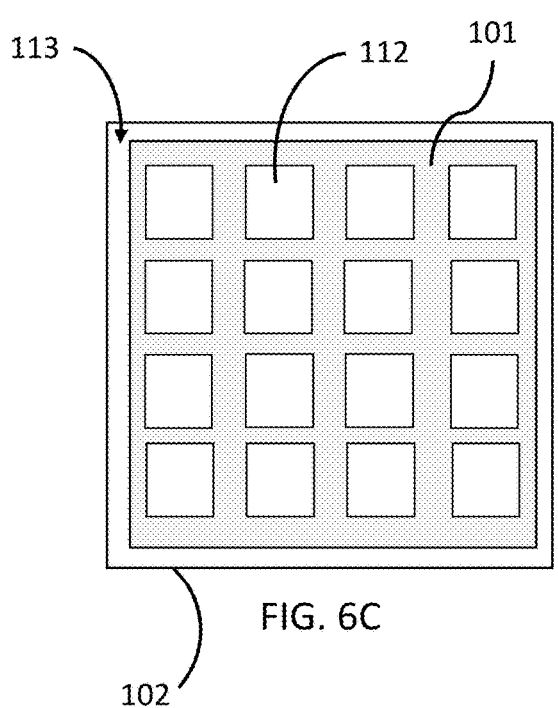
Figure 6D:
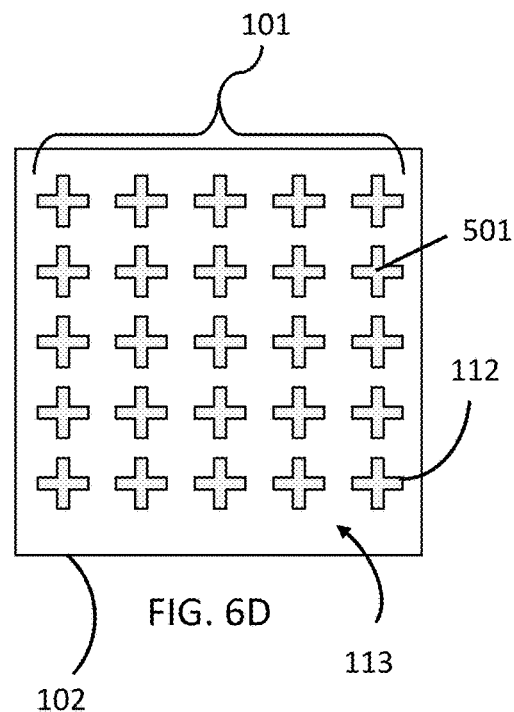

FIG. 6C is a top down schematic view of antenna layer 101 positioned on gap-facing surface 113 of transmissive substrate 102 and having a polarization-independent configuration. In this exemplary embodiment, antenna layer 101 comprises a continuous film of electrically conductive material, the film comprising a 4×4 ordered array of a plurality of surface features 112 that are square-shaped apertures. In some aspects, such as depicted here, apertures in an otherwise continuous film that is antenna layer 101 may extend wholly to transmissive substrate 102 or support substrate 104. However, an aperture in a continuous film need not extend all the way to transmissive substrate 101 or support substrate 104. In some aspects, an aperture that is a surface feature may extend downward toward a substrate, terminating at a region of antenna layer 101 or mirror layer 103 that is a continuous film on the underlying substrate. FIG. 6D is a top down schematic view of antenna layer 101 having an ordered array of a plurality of cross-shaped surface features 112.

The 4×4 and 5×5 array sizes shown in FIGS. 6B, 6C, and 6D are for descriptive purposes. In many embodiments, numbers of arrayed surface features 112 are greater and can vary depending on the preferred tuning characteristics of a notch filter. For example in some aspects, surface features 112 are positioned in an array that can be for example only a 5,000×5,000 ordered array or an ordered array with a larger number of surface features or an array that is not an ordered array.

In some embodiments, a notch filter 100 can be configured for and tuned for selectively attenuating the reflection of at least one wavelength of incident EMR having a selected polarization state. In some aspects, the EMR whose reflection is selectively attenuated may be circularly polarized. In some aspects, the EMR whose reflection is selectively attenuated may be linearly polarized. Some aspects comprise determining polarimetric information about the EMR in a first set of one or more than one spectral bands and using the determined polarimetric information when constructing a spectral map of EMR 105 in a selected spectral band that is incident on notch filter 100 for a plurality of selected time periods. In some aspects, selectively attenuating the reflection of at least one wavelength of incident EMR in a spectral band may occur regardless of the polarization state of the incident EMR 105.

Figure 7A:
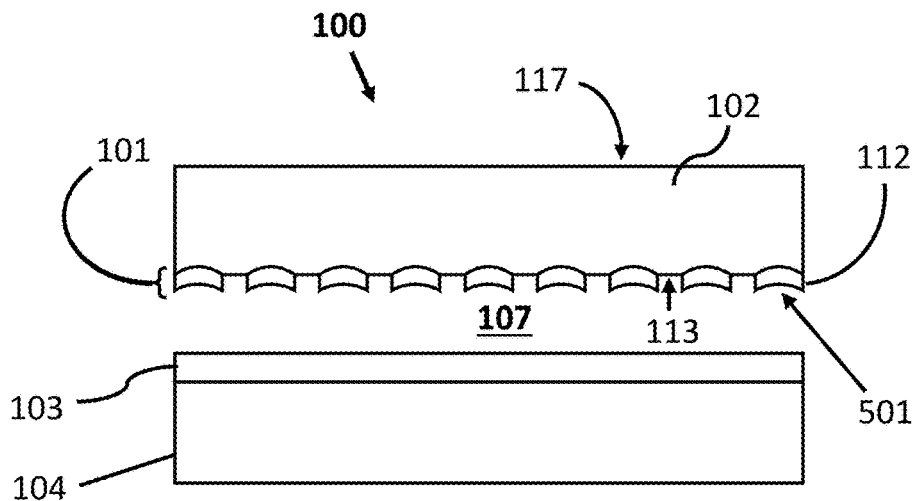
FIGS. 7A-7C show side schematic views of exemplary embodiments of a notch filter.
Figure 7B:
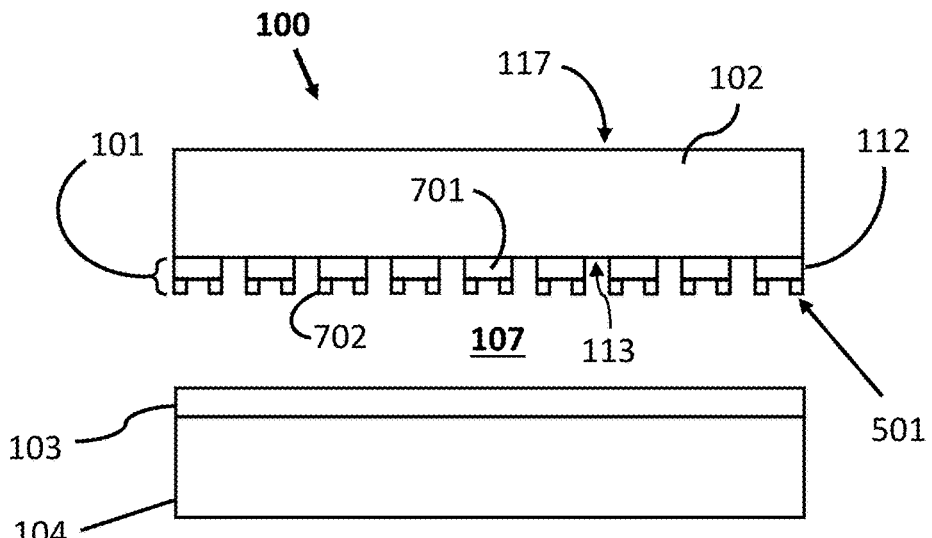
Figure 7C:
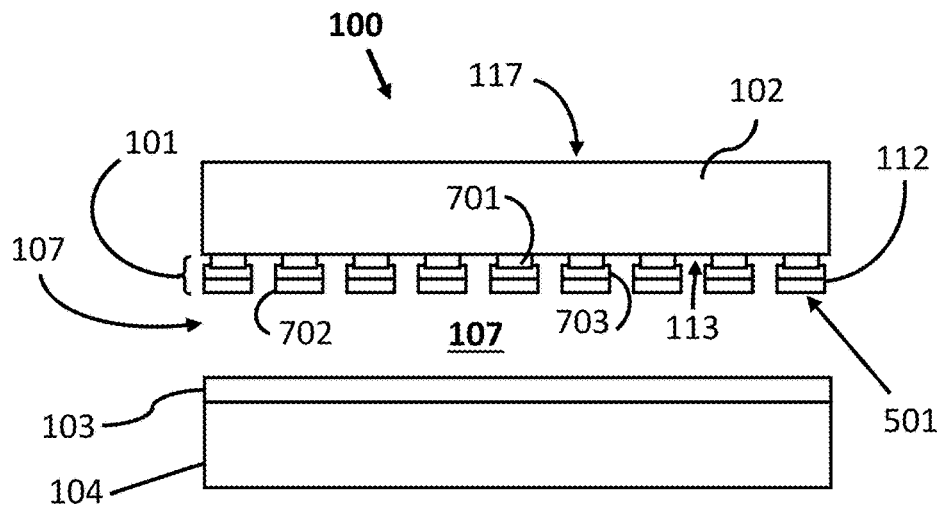

FIGS. 7A-7C show side schematic views of exemplary embodiments of notch filters 100 having different shapes and configurations of surface features 112. In some aspects, the antenna layers 101 shown in FIGS. 7A-7C are each useful with a mirror layer 103 that is a continuous film of conductive material. A notch filter 100 having an antenna layer 101 configured as in any of FIGS. 7A-7C and a mirror layer 103 that is configured as a continuous layer of conductive material can be useful for selectively attenuating the reflection of at least one wavelength of incident EMR 105. FIGS. 7A and 7B show notch filter 100 comprising antenna layer 101 having surface features 112 that are field-concentrating features. In some aspects, field-concentrating surface features may have relatively sharpened edges. The surface features 112 shown in FIG. 7A are examples of features having tops 501 that are not flat. As such the height of each feature is not uniform across the top of the feature. In some aspects then, the top of a surface feature may not be flattened but may be concave, convex, or other shape. In some aspects, the configuration shown in FIG. 7A may be fabricated by etching substrate 102 followed by deposition of surface features 112 to form antenna layer 101. In the exemplary embodiment of notch filter shown in FIG. 7B, surface features 112 comprise a plurality of layers, a bottom layer 701 and a top layer 702, the top layer 702 being formed by metal deposition. In this exemplary embodiment, top layer 702 comprises two separate regions. In some aspects, the configuration of antenna layer 101 and surface features 112 shown in FIG. 7B may be fabricated by a plurality of lithography steps. FIG. 6C shows an embodiment of notch filter 100 comprising antenna layer 101 having surface features 112 that comprise three layers of material, a bottom layer 701, a top layer 702, and a middle layer 703. In some aspects a notch filter configuration such as that shown in FIG. 7C may be useful for increasing the width of notch 201 of EMR whose reflection is selectively attenuated. In some aspects, an antenna layer 101 comprising a stack or plurality of layers of materials is a configuration that may be useful for any of a variety of purposes. Surface features 112 composition, numbers, layers, and dimensions can be selected for any of a variety of reasons, such as for example adjusting (increasing or decreasing) notch 201 depth, adjusting notch 201 width (increasing or decreasing the band width of EMR whose reflection is selectively reduced), suppressing harmonics that can cause multiple notches 201 rather than a single notch 201, selecting for the reflection of circularly polarized light, adjusting the shape of notch 201, altering notch 201 dispersion properties, altering notch 201 angular acceptance properties, or tuning notch depth 202 decay as a function of gap or for any combination of these exemplary reasons.

In some aspects, all layers in a surface feature 112 that comprises a plurality of layers may have the same material composition. In some aspects two or more layers in a surface element having a plurality of layers may have material compositions that are different from one another. The composition of at least a first layer in a plurality of layers may be different from the composition of at least a second layer in the plurality of layers.

It is not a requirement for notch filter 100 that all layers in a multi-layer surface feature have the same shape or same dimensions, and one or more layer in a single surface feature may be differently shaped and/or sized than the other layers. By way of example, layers 701 and 702 of surface features 112 in FIG. 7B have different heights and are shaped differently. Layers 701, 702, and 703 of surface features 112 in FIG. 7C are shaped and dimensioned differently.

FIGS. 8A-8D show an exemplary embodiment of notch filter 100 and surface feature 112 patterns of antenna layer 101 and mirror layer 103. The view in FIG. 8A is looking downward on and perpendicular to tops 501 of surface features 112 of antenna layer 101 and toward transmissive substrate 102, and the view in FIG. 8B is looking downward on and perpendicular to tops 501 of surface features 112 of mirror layer 103 and toward support substrate 104. Antenna layer 101 in FIG. 8A comprises a 4×4 ordered array of discrete surface features 112 that are rectangular patches positioned on gap-facing surface 113 of transmissive substrate 102. Mirror layer 103 in FIG. 8B comprises a 4×4 ordered array of patterned surface features 112 that are rectangular shapes arranged as shown and present in an otherwise continuous film of conductive material positioned on gap-facing surface 115 of support substrate 104.

FIG. 8C is a view of an exemplary embodiment of notch filter 100 comprising the antenna layer 101 and transmissive substrate 102 in FIG. 8A and mirror layer 103 and support substrate 104 in FIG. 8B. FIG. 8D is a side view of the notch filter shown in FIG. 8C along the section represented by dashed line A-A'. The view in FIG. 8C is from the perspective of incident EMR 105 and is downward on and perpendicular to transmissive substrate 102 (see 105 in FIG. 8D). The view continues through transmissive substrate 102 to antenna layer 101, thence through gap 107 to mirror layer 103 positioned across gap 107 from antenna layer 101. Antenna layer 101 comprises the 4×4 ordered array of surface features 112 shown in FIG. 7A and represented by the stippled rectangles. Across gap 107, mirror layer 103 comprises the 4×4 array of surface features 112 shown in FIG. 8B and represented by the shaded rectangles positioned at an oblique angle to the surface features 112 in antenna layer 101 in this view.

As is apparent on viewing FIGS. 8C-8D, surface features 112 in antenna layer 101 and in mirror layer 103 are in registration. That is, when viewing notch filter 100 from the perspective of incident EMR 105 that is downward onto and perpendicular to transmissive substrate 102, the features in mirror layer 103 are largely opposite from the features in antenna layer 101. In this configuration, the features are said to be overlapping or in registration. In this exemplary embodiment, each surface feature in one layer is in register with a single feature in the other layer and the surface feature array in each layer is of the same configuration 4×4 and of about the same dimensions. In such situations, incident EMR 105 interacts with the two layers only in the region where their surface features overlap and are in registration. Incident EMR 105 interacting in these overlapping regions can be absorbed by notch filter 100, and its reflection can be selectively attenuated. A notch filter 100, having antenna layer 101 and mirror layer 103 with overlapping surface features 112 (i.e., having surface features that are in registration) when viewed from the perspective of incident radiation 105 arriving at and perpendicular to transmissive substrate 102, is configured to selectively attenuate the reflection of at least one wavelength of incident radiation. The region of gap 107 between surface features 112 in antenna layer 101 and in mirror layer 103 that are in registration (overlapping) is referred to as the gap active region. The gap active region is that region of the gap where EMR that enters notch filter 100 interacts with antenna layer 101 and mirror layer 103. In some aspects, a notch filter 100 having antenna layer 101 may have surface features 112 and mirror layer 103 may be a continuous film of material. In these aspects, gap active region is that region of gap 107 where surface features 112 in antenna layer 101 are positioned across gap 107 from continuous film material of mirror layer 103. In some aspects, surface features in antenna layer 101 and surface features in mirror layer 103 may not be in complete registration, i.e., there may be some surface features in one or both layers that do not overlap with a surface feature in the other layer. In these aspects, the mirror layer and antenna layer are considered to be in partial registration, i.e., some but not all features in the layers are in registration (overlap), and the region of overlap is that region where surface structures and/or continuous film are across gap 107 and positioned in registration.

Figure 9A:
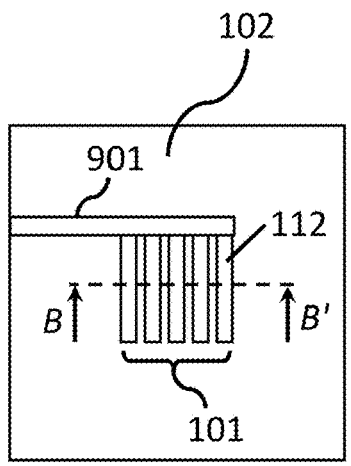
FIGS. 9A-9F show schematic representations of parts of an embodiment of a notch filter and a schematic side view of the assembled notch filter configured for polarization-dependent reflection of EMR.
Figure 9B:
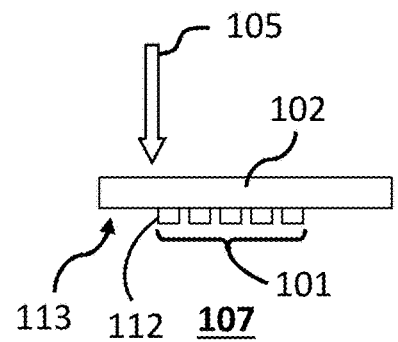

FIGS. 9A-9F schematically depict parts of an exemplary tunable notch filter and the assembled notch filter 100 that is configured for polarization-dependent reflection of incident EMR 105. For each of FIGS. 9A, 9C, and 9E, the view is from the perspective of incident EMR 105 arriving at transmissive substrate 102 and is downward on and perpendicular to transmissive substrate 102 (see arrows 105 in side views FIG. 9B, FIG. 9D, and FIG. 9F). FIG. 9A depicts a downward view through transparent transmissive substrate 102 to antenna layer 101 having surface features 112 that are rectangular patches and that are electrically connected by a first electrode 901. FIG. 9B is a side view of transmissive substrate 102 and antenna layer 101 shown in FIG. 9A along the section represented by dashed line B-B'. Surface features 112 of antenna layer 101 are positioned on gap-facing surface 113 of transmissive substrate 102 that is facing gap 107 (FIG. 9B). Here, first electrode 901 (FIG. 9A) is also positioned on gap-facing surface 113. First electrode 901 electrically connects surface features 112 of antenna layer 101 with one another and with an external circuit element. Electrode 901 is not depicted in the cross section shown in FIG. 9B.

Figure 9C:
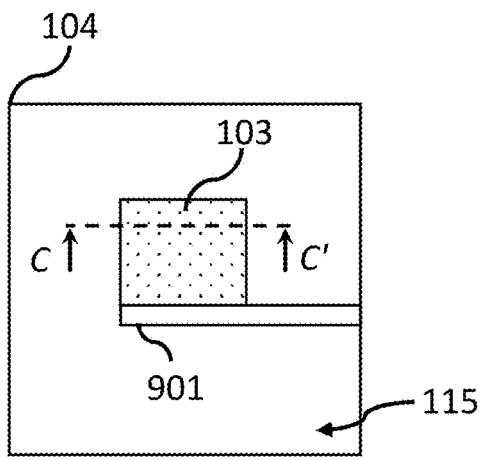
Figure 9D:
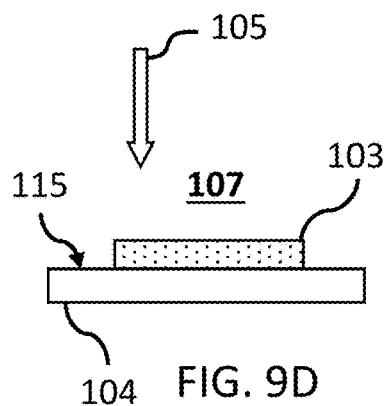

FIG. 9C is a view of support substrate 104 and mirror layer 103 from the perspective of incident EMR 105 arriving at and perpendicular to notch filter 100. FIG. 9D is a side view of support substrate 104 and mirror layer 103 shown in FIG. 9C along the section represented by dashed line C-C'. As such, FIG. 9C is a top-down view from gap 107 (see arriving incident radiation 105 in FIG. 9D) onto mirror layer 103. Transmissive substrate 102 and antenna layer 101 are not depicted in this view. Mirror layer 103 is positioned on gap-facing surface 115 of support substrate 104 (FIGS. 9C-9D). Also positioned on support substrate 104 is a second electrode 901 that electrically connects mirror layer 103 with an external circuit element. Electrode 901 on support substrate 104 is not depicted in the cross section shown in FIG. 9D. In this exemplary embodiment, mirror layer 103 is a continuous film of conductive material.

Figure 9E:
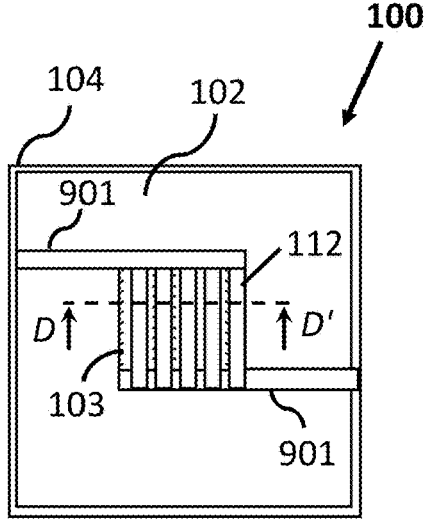
Figure 9F:
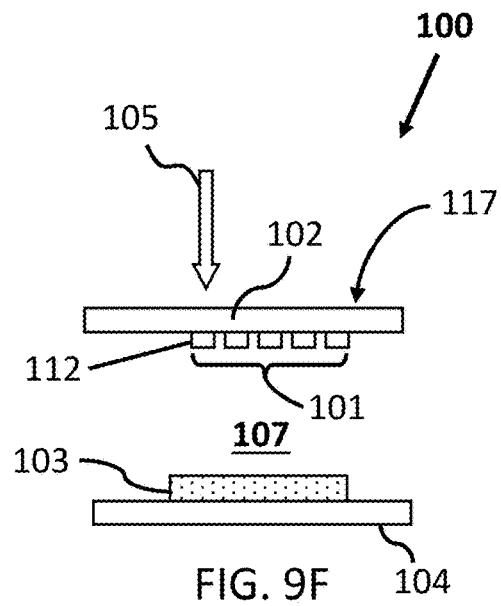

FIG. 9E is a view of an exemplary embodiment of notch filter 100 comprising the antenna layer 101 and transmissive substrate 102 in FIG. 9A and mirror layer 103 and support substrate 104 in FIG. 9C. FIG. 9F is a side view of the notch filter shown in FIG. 9E along the section represented by dashed line D-D'. The view in FIG. 9E is from the perspective of incident EMR 105 and is downward on and perpendicular to transmissive substrate 102 (see arrow 105 in FIG. 9F). The view continues through transmissive substrate 102 to antenna layer 101, thence through gap 107 (see FIG. 1 and FIG. 9F) to mirror layer 103 positioned across gap 107 from antenna layer 101. Antenna layer 101 comprises surface features 112 that are rectangular patches and that are electrically connected by first electrode 901 (FIGS. 9A, 9B, 9F). Across gap 107, mirror layer 103 comprises the continuous layer of conductive material.

As can be seen in FIG. 9E, antenna layer 101, having surface features 112, and mirror layer 103 are in registration. That is, when viewing notch filter 100 from the perspective of incident EMR 105 downward onto and perpendicular to transmissive substrate 102, the features in antenna layer 101 are opposite from continuous film of conductive material that is mirror layer 103. In this exemplary embodiment, antenna layer 101 and mirror layer 103 are said to be overlapping. The region of tunable notch filter 100 shown in FIG. 9E where resonation occurs is the region where the surface features 112 of antenna layer 101 overlap with continuous mirror layer 103. Radiation interacting in these overlapping regions can be absorbed by notch filter 100 and its reflection can be selectively attenuated. A notch filter 100, having an antenna layer 101 with surface features that are parallel rectangular strips and that overlap a mirror layer 103 that is a continuous film of conducting material (i.e., surface features 112 on antenna layer 101 are in registration with continuous mirror layer 103) when viewed from the perspective of incident radiation 105 arriving at and perpendicular to transmissive substrate 102, is configured to selectively attenuate the reflection of at least one wavelength of incident radiation in a polarization-dependent manner. EMR that is reflected by notch filter 100 can also be tuned by adjusting gap distance 111.

In this exemplary embodiment, the electrical connection between first and second electrodes 901 and antenna layer 101 and mirror layer 103 respectively, enables antenna layer 101 and mirror layer 103 to function as gap distance sensors 108, thereby enabling capacitive measurement of gap distance 111.

In some embodiments, both antenna layer 101 and mirror layer 103 may each be made of a continuous film of conductive material without having discrete surface features. In these embodiments, antenna layer 101 and mirror layer 103 may be in registration. That is, when viewing notch filter 100 from the perspective of incident EMR 105, downward onto and perpendicular to transmissive substrate 102, the continuous film of conductive material that is antenna layer 101 is seen to overlap the continuous film of conductive material that is mirror layer 103. Incident radiation 105 that interacts with notch filter 100 in the region of overlapping layers may be absorbed or reflected by notch filter 100 and the reflection of some radiation may be selectively attenuated. A notch filter configured this way may be configured to selectively attenuate the reflection of some incident EMR 105.

Figure 10A:
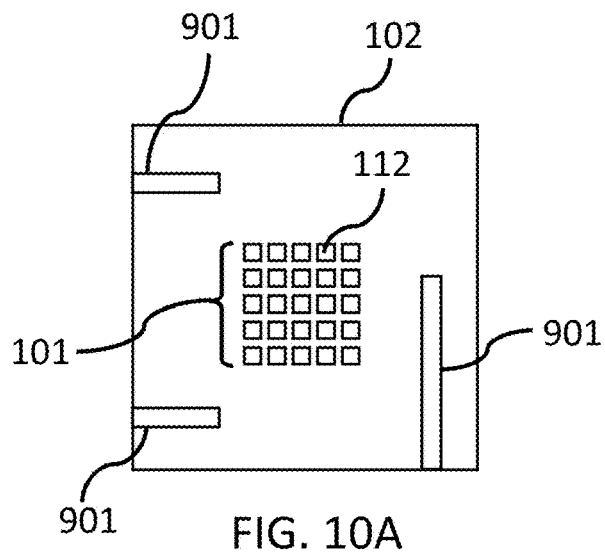
FIGS. 10A-10C schematically depict parts of an exemplary tunable notch filter and the assembled notch filter configured for planarized capacitive distance sensing.
Figure 10B:
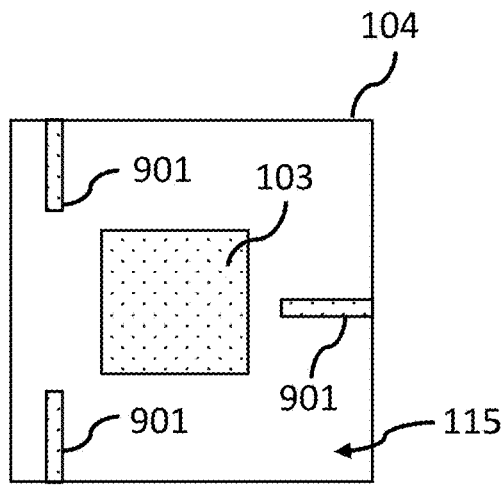
Figure 10C:
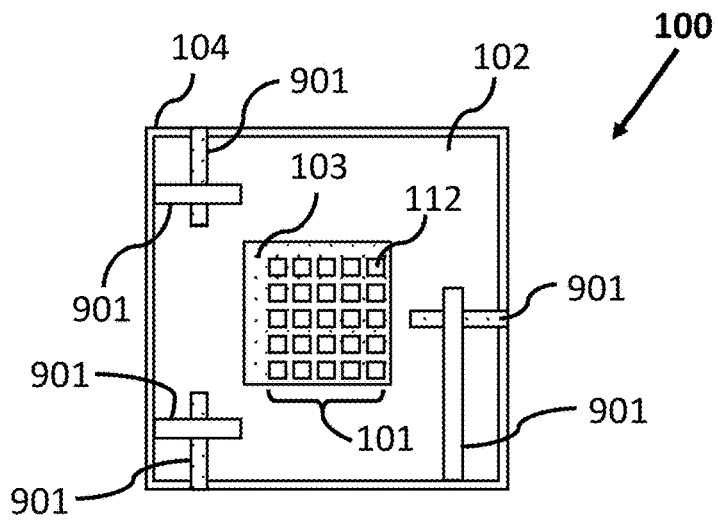

FIGS. 10A-10C schematically depict parts of an exemplary embodiment of a tunable notch filter and the assembled notch filter 100 that is configured for planarized capacitive distance sensing. Notch filter 100 in this embodiment is configured for selectively attenuating the reflection of EMR regardless of the polarization state of incident EMR 105, i.e., a polarization-independent configuration. Here, notch filter 100 is configured for measuring gap distance 111 at three locations where a region of a first electrode 901 positioned on transmissive substrate 102 is located across gap 107 from a region of a second electrode 901 positioned on support substrate 104. Analogous to overlapping surface features and overlapping antenna layers and mirror layers as described for FIG. 8 and FIG. 9, electrodes 901 positioned in this manner are said to be overlapping and are in registration where the electrodes overlap. For each of FIGS. 10A-10C, the view is downward from the perspective of incident EMR 105 arriving at and perpendicular to entry surface 117 of transmissive substrate 102. FIG. 10A depicts a downward view through transparent transmissive substrate 102 to antenna layer 101 having surface features 112 that are rectangular patches configured in a regular 5×5 array pattern. Surface features 112 of antenna layer 101 and three electrodes 901 are positioned on gap-facing surface 113 of transmissive substrate 102 (as in FIG. 1). FIG. 10B is a view of support substrate 104 and mirror layer 103 and is a downward view across gap 107 onto gap-facing surface 115 of second substrate 104. Mirror layer 103 and three electrodes 901 are positioned on gap-facing surface 115 of support substrate 104. Mirror layer 103 in this embodiment is a continuous layer of conductive material.

FIG. 10C shows a view of notch filter 100 comprising the antenna layer 101 and transmissive substrate 102 in FIG. 10A and mirror layer 103 and support substrate 104 in FIG. 10B. The view in FIG. 10C is from the perspective of arriving incident EMR 105 and is downward on and perpendicular to transmissive substrate 102. The view continues through transmissive substrate 102 to antenna layer 101 with surface features 112, thence through gap 107 to mirror layer 103 positioned across gap 107 from antenna layer 101. Antenna layer 101 comprises the 5×5 ordered array of surface features 112 shown in FIG. 10A and represented by the open squares. Across gap 107, mirror layer 103 comprises the continuous layer of conductive material represented by the stippled square as in FIG. 10B. A region of each electrode 901 positioned on first substrate 102 is disposed across from a region of a corresponding electrode 901 positioned on support substrate 104, enabling capacitive measurement of gap 107. The regions that overlap in pairs of corresponding electrodes 901 may be selected as is necessary to allow for positioning of filter elements and need not be as depicted in the example shown in FIG. 10C. In this exemplary embodiment, continuous mirror layer 103 occupies a larger area than does antenna layer 101, but this is not a requirement for operation of notch filter 100. In some aspects, the dimensions of antenna layer 101 and mirror layer 103 may be selected to allow for positioning of filter elements in the respective layers and to allow for tolerance in layer alignment while also enabling proper operation of notch filter 100.

In some aspects, when antenna layer 101 and mirror layer 103 both comprise distinct surface features 112 and each layer is not configured as a continuous layer of conductive material, antenna layer 101 and mirror layer 103 may have surface features 112 positioned such that the area occupied by antenna layer 101 on transmissive substrate 102 is of a different size than is the area occupied by surface features 112 of mirror layer 103 on support substrate 104. In some embodiments, one or more distinct surface features in antenna layer 101 may not overlap with a surface feature in mirror layer 103. In some aspects then, a region of antenna layer 101 having surface features 112 may only partially overlap a region of mirror layer 103 having surface features 112. Absorption of EMR by notch filter 100 is mediated in areas where surface features in antenna layer 101 are in registration with (overlap) surface features in mirror layer 103 and in regions where surface features in either antenna layer 101 or mirror layer 103 are in registration with a continuous film that is mirror layer 103 or antenna layer 101, respectively.

Figure 11:
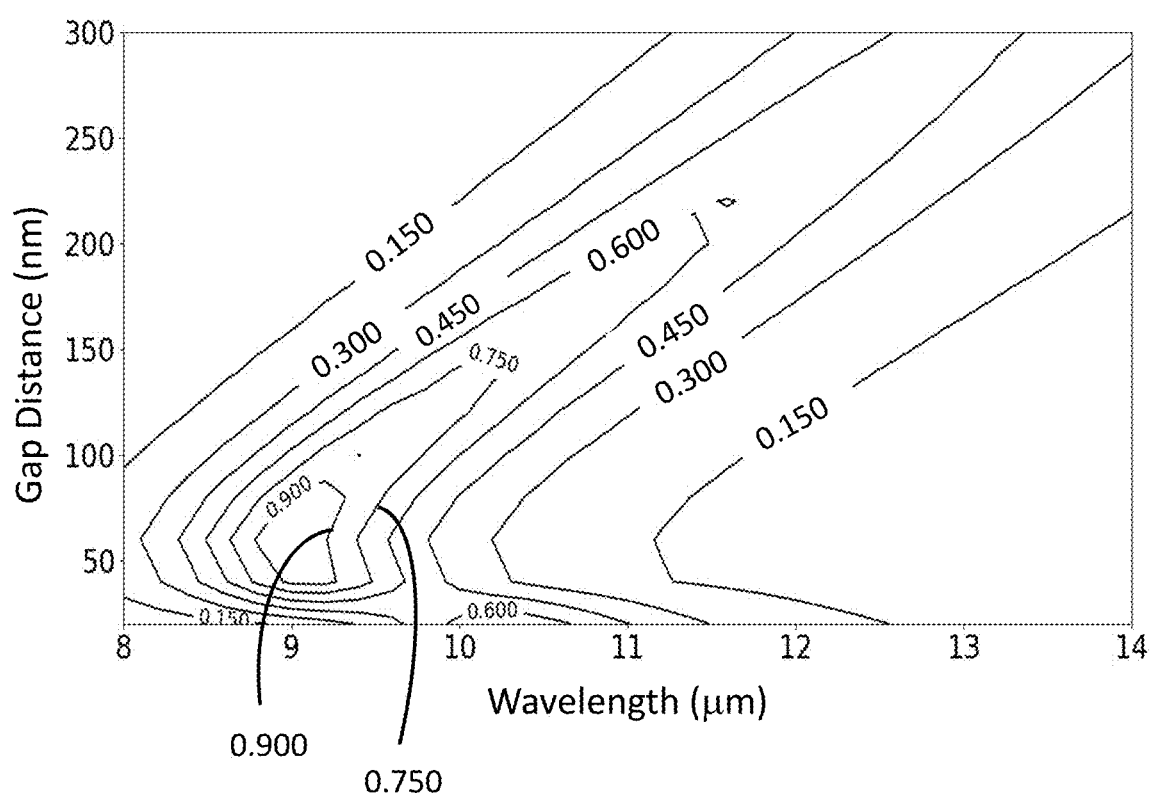
FIG. 11 is a contour plot from a COMSOL simulation showing absorption of incident radiation as a function of wavelength and gap distance for an exemplary configuration of a notch filter.

Notch filter 100 can be configured and tuned to selectively attenuate the reflection of incident EMR 105 in a variety of different spectral regions. FIG. 11 is a contour plot of a COMSOL simulation showing absorption of incident radiation 105 as a function of incident wavelength and gap distance 111 for an exemplary configuration of a notch filter 100. In this example, notch filter 100 is configured with gap 107 being a vacuum gap. Surface features 112 of antenna layer 103 were modeled as square patches of gold having a width (W) of 2.5 µm, a spacing distance (D) of 100 nm, and a height (H) of 250 nm. Simulations were performed with periodic boundary conditions (an infinite array). Mirror layer 103 used for this simulation is a continuous layer of gold. The numbers on the plot contour lines represent the fraction of incident radiation that is absorbed by the notch filter, (i.e., the fraction of EMR whose reflection is selectively attenuated). Absorption of incident EMR 105 was modeled for a spectral region over the wavelength range of 8 µm to 14 µm and for gap distances 111 from about 20 nm to over 300 nm. The linearly dispersive region from about 50 nm to greater than 300 nm for gap distance 111 is an example of a gap distance 111 range where EMR absorption can be readily controlled with this exemplary notch filter configuration. The extent of absorption of incident radiation 105 across the spectral region from 8 µm to 14 µm for a given gap distance 111 varies. For example at gap distance 111 of 50 nm, absorption of radiation around 9 μm (from about 8.8 μm to about 9.2 μm) is greater than or equal to about 90% and is higher than is absorption of radiation of longer and shorter wavelengths.

In some aspects, a notch filter 100 configured for selectively attenuating the reflection of EMR in the visible region of the EMR spectrum comprises an antenna layer 101 made of surface features 112 that are gold or silver patches on a transmissive substrate 102 of SiO$_2$ and wherein each surface feature has a height (H) of about 10 nm and width (W) of about 25 nm, and are on a pitch (P) of about 35 nm. As such spacing distance (D) is about 10 nm. For this configuration in many aspects, a useful range of gap distance 111 may be from about 10 nm to about 100 nm.

In some aspects a notch filter 100 configured for selectively attenuating the reflection of EMR in the NIR and SWIR regions of the EMR spectrum comprises an antenna layer 101 made of surface features 112 that are gold patches on a transmissive substrate 102 of sapphire and wherein each surface feature 112 has a height (H) of about 5 nm and width (W) of about 80 nm, and surface features 112 are on a pitch (P) of about 90 nm. As such spacing distance (D) is about 10 nm. For this configuration in many aspects, a useful range of gap distance 111 may be from about 15 nm to about 100 nm.

In some aspects a notch filter 100 configured for operation in the LWIR region can be tuned for selectively attenuating the reflection of EMR in a spectral region from about 8 μm to about 14 μm in the EMR spectrum and comprises an antenna layer 101 having surface features 112 that are gold patches on a transmissive substrate 102 of ZnSe and wherein each surface feature 112 has a height (H) of about 30 nm and width (W) of about 1.75 μm and spacing distance (D) between surface features 112 is about 50 nm. For this configuration in many aspects, a useful range of gap distance 111 may be from about 15 nm to about 400 nm.

In some embodiments, tunable notch filter 100 may be part of an optical system 1200. In some aspects, an optical system functions to receive EMR, pass the EMR to antenna layer 101 and mirror layer 103, receive EMR that is reflected by notch filter 100 and measure reflected EMR. Therefore, an optical system 1200 can comprise elements configured and positioned to accomplish any combination of or all of those functions. The tunable notch filter described herein exhibits improved operational capability with EMR arriving from a broad range of incident angles, in some aspects providing accurate selective attenuation of the reflection of EMR arriving from angles of up to 60°, thereby allowing for use with many different types of optical systems.

In some aspects an optical system 1200 comprising tunable notch filter 100 comprises one or more than one optics that are different from tunable notch filter 100. In some aspects, in addition to a notch filter 100, optical system 1200 may comprise a plurality of different types of optics, or a plurality of the same type of optic. An optical system 1200 may comprise a plurality of tunable notch filters 100, and in some aspects the plurality of tunable notch filters may be of the same type or have the same or similar components. For example, the notch filters may be made of the same materials having about the same dimensions and may have the same tunability. In some aspects, one or more of a plurality of tunable notch filters 100 in optical system 1200 may have one or more characteristics that are different from one or more of other notch filters in the plurality. In some embodiments, where a plurality of tunable notch filters are present in optical system 1200, each notch filter 100 may be independently tunable. Tunable notch filter 100 can be configured for use with and/or integrated with any of a variety of optics and optical systems. Exemplary optics and optical systems that may be useful in embodiments include imaging optics, lenses, prisms, mirrors, detectors, concentrators, dispersing devices, films, filters, cameras, radiometers, spectrometers, or other optic or optical system. Optics and optical systems comprising a tunable notch filter 100 may be useful for receiving EMR, directing or passing EMR to notch filter 100, directing or passing EMR 106 reflected by notch filter 100, receiving EMR 106 reflected by notch filter 100, and analyzing received EMR. In some aspects an optic or optical system comprising tunable notch filter 100 may be configured to receive EMR and reflect at least a portion of the received EMR to the notch filter 100 or to a separate notch filter 100. In some embodiments, optical system 1200 comprising notch filter 100 may further comprise hardware for and be configured for measuring at least one property of EMR 106 reflected by the notch filter. Some exemplary properties of EMR that may be measured include spectral intensity, spectral information, spatial information, temporal information, polarimetric information, and phase information.

Figure 12A:
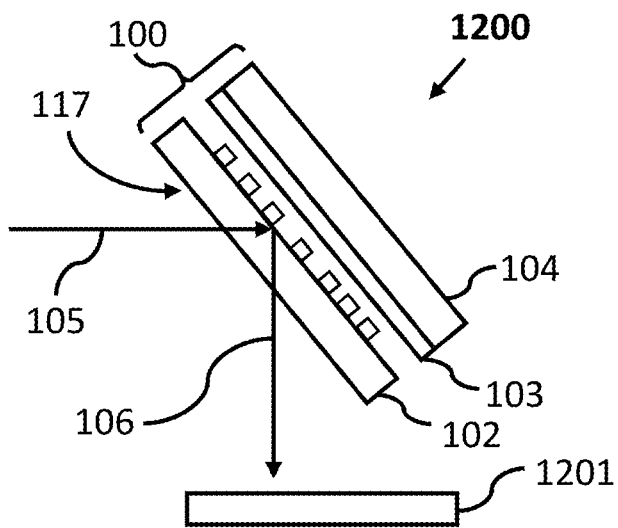
FIGS. 12A-12B schematically depict exemplary embodiments of an optical system comprising a tunable notch filter and associated optics.
Figure 12B:
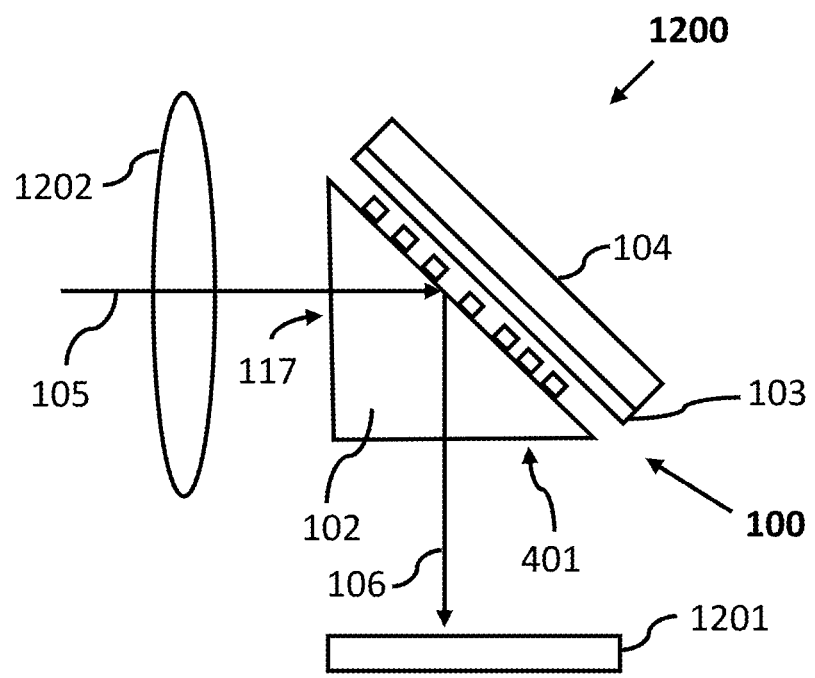

FIGS. 12A-12B schematically depict exemplary embodiments of optical system 1200 comprising tunable notch filter 100 and associated optics. FIG. 12A depicts an embodiment of optical system 1200 comprising notch filter 100 and EMR detector 1201, wherein optical system 1200 is configured such that notch filter 100 receives incident EMR 105 through entry surface 117 of transmissive substrate 102 and directs reflected EMR 106 through an exit surface that is the same surface as entry surface 117, thence to radiation detector 1201. FIG. 12B shows an exemplary embodiment of optical system 1200 that comprises notch filter 100, imaging optic 1202, and EMR detector 1201. This exemplary embodiment is configured such that incident EMR 105 is directed by imaging optic 1202 to pass through transmissive substrate 102 for interaction with antenna layer 101 and mirror layer 103, and EMR 106 reflected by notch filter 100 is directed to exit surface 401 of transmissive substrate 102 and on to EMR detector 1201. In some aspects then, EMR detector 1201 is positioned to receive electromagnetic radiation reflected by notch filter 100 and is an image sensor. In some embodiments, a camera comprises an optical system, the optical system comprising a notch filter 100, an imaging optic 1202, and an EMR detector 1201 that is an image sensor and that is positioned to receive electromagnetic radiation reflected by the notch filter 100.

Some embodiments include methods for analyzing EMR using a reflection mode tunable notch filter 100 and tuning the notch filter to selectively attenuate the reflection of EMR in a selected spectral band to a detector array 1201 for a plurality of selected time periods. In some embodiments, for at least one selected time period in the plurality of time periods, methods include selectively attenuating the reflection of EMR in one or more than one selected spectral bands. In some embodiments, methods include determining information about the EMR in the selected spectral band whose reflection to the detector array is selectively attenuated for a selected time period. In some aspects, determined information may include one or more of spectral intensity information, spatial information, and polarimetric information. In some embodiments, methods include constructing a spectral map of the EMR in the one or more selected spectral bands of EMR 105 that is incident on the tunable notch filter for the plurality of selected time periods.

In some embodiments methods for analyzing EMR 105 incident on a notch filter 100 are useful in numerous applications including for example scene imaging, satellite imaging, identification of remote objects, analysis of chemical and physical markers in a variety of settings, and medical imaging. In some embodiments, one or more additional applications include chemical analysis of emissions, detection of improvised explosive devices, and protection from directed-energy weapons that target personnel, missiles, vehicles, and optical devices. Methods may also be useful for multispectral infrared (IR) hyperspectral imaging to provide for visualization of images through obscurants such as smoke, dust, and camouflage and can be used for nighttime automated passive detection and identification of objects over large scene areas.

The tuning state of a tunable notch filter 100 may be selected for one or more than one of a variety of reasons, including by way of example only, to enhance spectral and spatial discrimination within a captured scene, to enhance discrimination of chemical species when determining and/or quantifying the presence of one or more chemicals in a sample, to enhance detection of objects, forms, or bodies that are obscured, and other reasons for which it may be useful to enhance spectral, spatial, or polarimetric analysis of a scene. In some aspects, one or more spectral bands of incident EMR 105 whose reflection is to be selectively attenuated may be chosen based on selected characteristics of a scene that is to be spectrally mapped. For example only, one or more bands of EMR whose reflection is to be selectively attenuated may be chosen based on spectral and/or polarimetric characteristics that can be useful for enhancing contrast in a scene.

In some embodiments, spectral intensity information and spatial information about EMR 105 that is incident on a notch filter 100 and in a first set of one or more than one spectral bands can be computationally determined by subtracting a notched data array, representing a detector array response to EMR reflected by notch filter 100 for a first selected time period, from a broadband data array that represents a detector array response to EMR 106 reflected for a second selected time period. In some embodiments, spectral intensity information and spatial information about EMR 105 that is incident on a notch filter 100 and in a first set of one or more than one spectral bands can be computationally determined by subtracting a first notched data array, representing a detector array response to EMR 106 reflected by notch filter 100 for a first selected time period, from a second notched data array, the second notched data array representing a detector array response to EMR 106 reflected the notch filter 100 when tuned to a different attenuating state for a second selected time period. By using the determined spectral intensity and spatial information about the EMR 105 that is incident on the notch filter and in the first set of one or more than one spectral bands and received data arrays for each of a plurality of selected time periods, a spectral map of EMR 105 in the one or more selected spectral bands that is incident on notch filter 100 for the plurality of selected time periods can be constructed.

Figure 13:
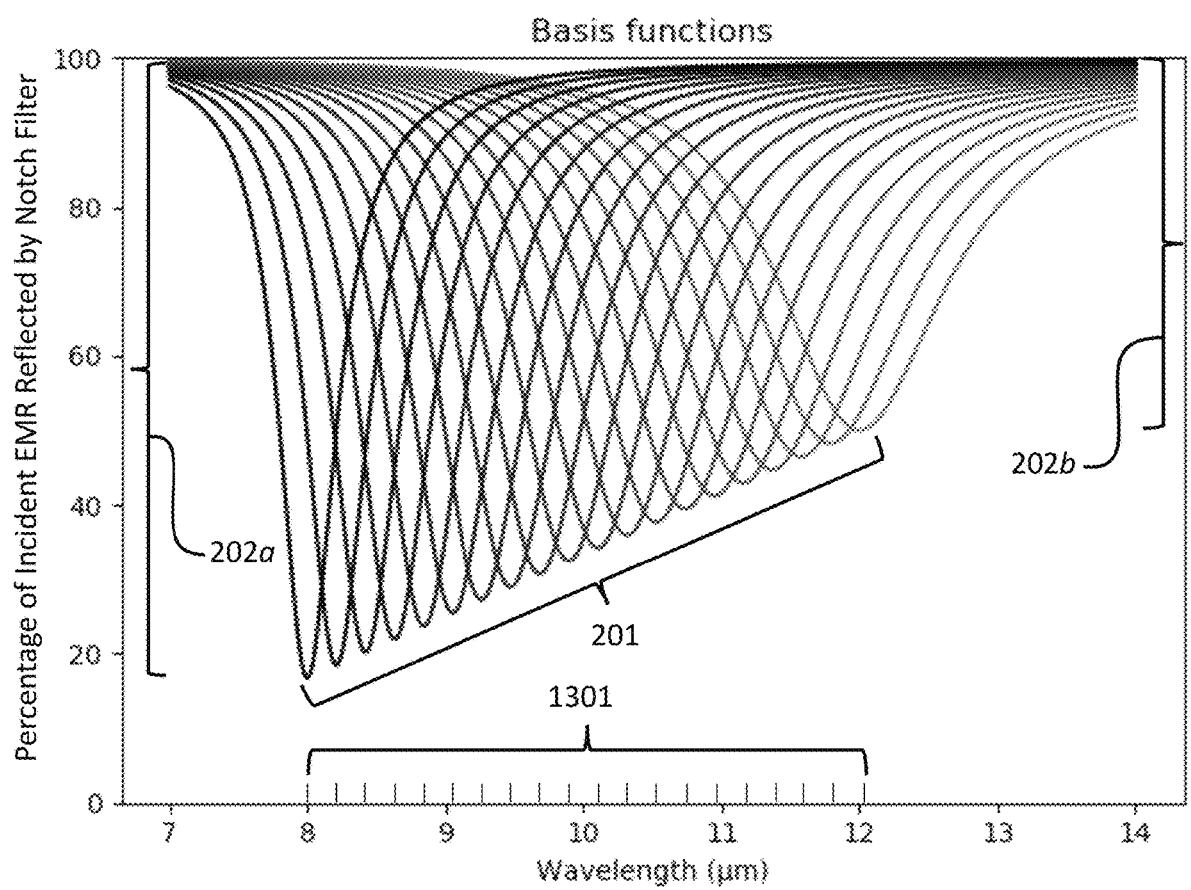
FIG. 13 shows the percentage of EMR that is incident on and reflected by a notch filter that is tuned at each of 20 different states to selectively attenuate the reflection of EMR. The set of twenty notches is designed to serve as a basis function set for calibration of a tunable notch filter spectrometer.
Figure 14C:
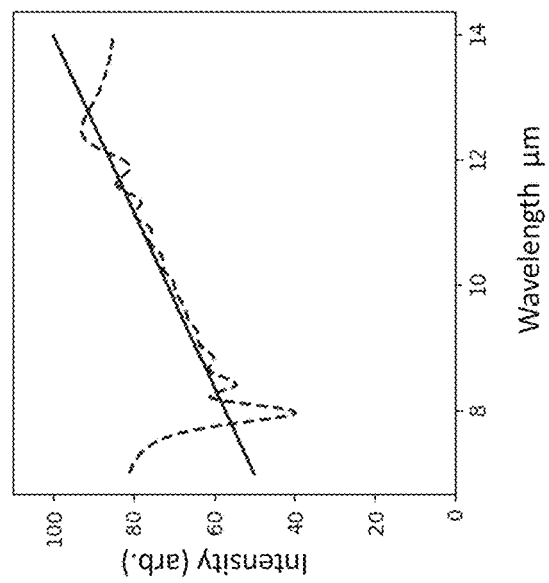
FIGS. 14A-14F show six examples of spectral intensity reconstruction using the Moore-Penrose pseudoinverse method and the basis function set of twenty notches shown in FIG. 13.
Figure 14B:
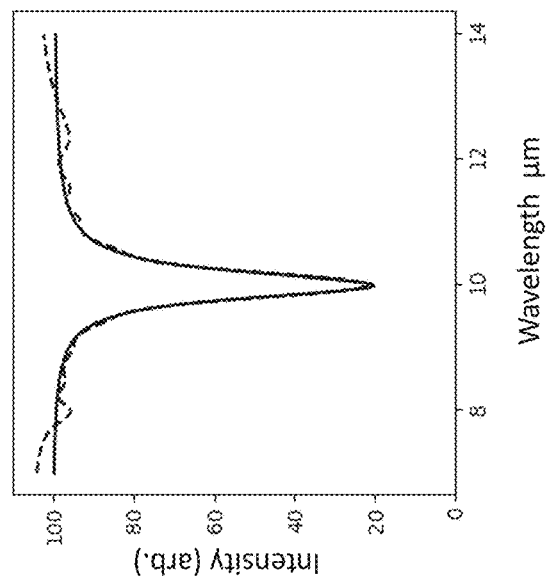
Figure 14A:
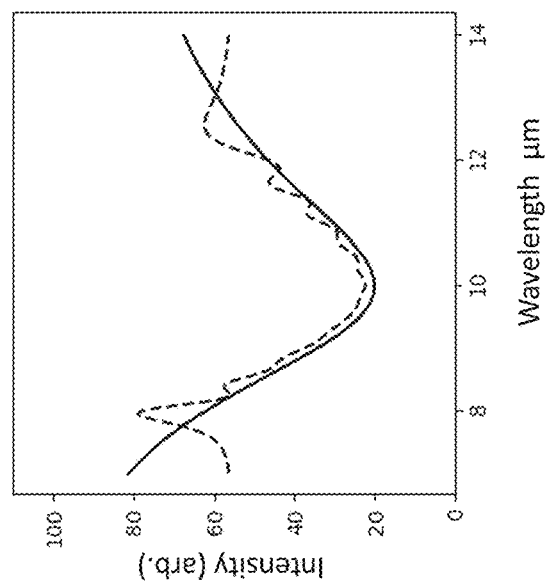
Figures 14D, 14E, 14F:
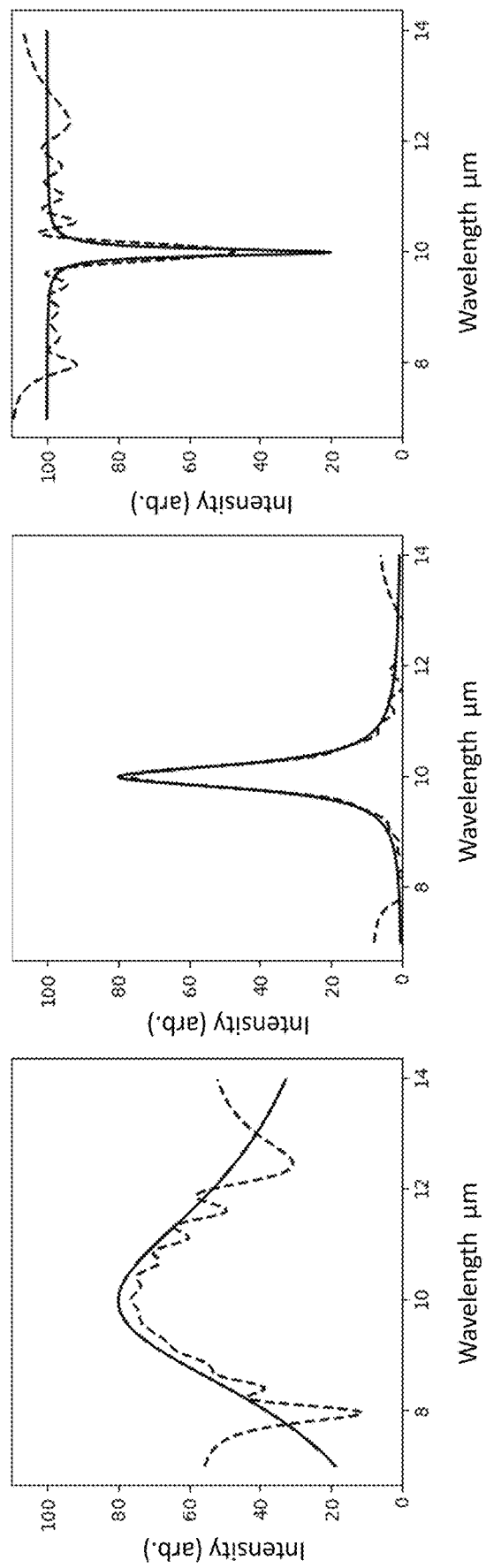

For computation, the wavelengths of EMR reflected for each selected time period in a plurality of selected time periods and the selected tuning state of a notch filter 100 for the respective time periods are necessarily discretized into arrays for comparison. The discretized arrays are considered here with regard to calibration and determining spectral intensity information. For each notch filter tuning state, k, $1 \leq k \leq M$, there will be a measurement of the spectral intensity of the EMR passed by the notch filter, $c_k$, at each wavelength, $\lambda_l$, $1 \leq l \leq N$, which can be stored in matrix $\overline{\overline{T}} = T_{kl} = c_k(\lambda_l)$. An example of a calibration dataset (a set of basis functions) of 20 different Lorentzian notches is illustrated in FIG. 13. FIG. 13 shows the percentage of EMR that is incident on and reflected by a notch filter 100 that is tuned at each of 20 different states to selectively attenuate the reflection of EMR. The set of 20 notches 201 is designed to serve as a basis function set for calibration of a tunable notch filter 100. Here, the center wavelength 1301 for each notch 201 is positioned differently, i.e., at a different wavelength, as a result of the notch filter being tuned differently at each of twenty different states. The twenty notch center wavelengths span a selected spectral band of about 8 µm to about 12 µm. Each notch depth 202 indicates the percentage of incident EMR 105 in a single spectral band of incident EMR 105 that is reflected by a notch filter 100 for a selected time period. In this exemplary embodiment, each notch exhibits a different notch depth 202, a result of the phenomenology of the tunable notch filter. However, this is not a requirement for a basis function set. For ease of viewing, notch depth 202 is labeled only for the notches 201 at 8 µm 202a and 12 µm 202b.

For spectrum $\vec{S} = \{S(\lambda_1), \ldots, S(\lambda_N)\}$, a detector array will receive integrated intensity $$x_k = \sum_{l=1}^{N} T_{kl} S(\lambda_l)$$

for each notch filter tuning state k. However in some embodiments, because S is unknown, it can be challenging to compute the best estimate of $\vec{S}$ from spectral intensity measurements of reflected EMR 106 for each of the multiple notch filter tuning states. This can be described as the following minimization problem: $\vec{S} \sim \mathrm{argmin}_S \| \overline{\overline{T}} \, \vec{S} - \vec{x} \|$, where $\|\cdot\|$ represents a norm (typically the L2 Euclidean norm). A solution can be retrieved from this minimization problem by any of a variety of approaches. In some aspects, it may be preferred to retrieve a solution using the Moore-Penrose pseudoinverse. FIGS. 14A-14F show six examples of spectral intensity reconstruction using the Moore-Penrose pseudoinverse method and the basis function set of twenty notches 201 shown in FIG. 13. The solid line in each graph represents a hypothetical intensity profile of EMR 105 in the selected spectral band that is incident on a notch filter. The dashed line in each graph represents the reconstructed solution of the corresponding hypothetical spectral intensity profile of the EMR 105 that is incident on the notch filter. It is to be noted that in some aspects, tuning a notch filter to selectively attenuate the reflection of radiation in a narrower band or bands and/or increasing the number of notches in a set of basis functions can enhance the accuracy of reconstruction of a spectral intensity profile.

Several additional methods for retrieving a solution for the best estimate of from spectral intensity measurements of EMR 106 reflected by notch filter 100 when the filter is tuned to different tuning states include regularized estimation, monte carlo methods, and gradient descent methods, to name a few. embodiments other methods may be useful for reducing spatial-spectral artifacts that can be present in a constructed spectral map. For example a plurality of notched data arrays, each being representative of the same scene, can be interpolated to produce an estimated broadband data array that represents an estimated detector response to radiation 106 reflected by notch filter 100 for a time period that would be substantially coincident with a time period for which radiation was selectively reflected to a detector array 1201. Subtracting the corresponding notched data array from the estimated broadband data array can be useful for determining spectral intensity information about the radiation whose reflection to the detector array 1201 was selectively attenuated.

In some aspects, a notch filter acts as a resonant absorber of EMR to match the impedance of an incoming electromagnetic wave to the impedance of a structure. When the impedances are matched, the electromagnetic wave can be absorbed. When the impedances do not match, the electromagnetic wave is reflected. For a notch filter 100, the efficiencies of absorption and reflection will depend on materials properties and structural properties of the filter. Previously described tunable notch filters are based on tuning materials properties, e.g. through applied fields. Many embodiments described herein are designed to effect tuning of a reflection mode tunable notch filter 100 by altering the structure of the filter.

The theoretical basis for impedance matching is known in the art and can be found in texts on wave theory, such as antenna design and electro-optics design. In modern design practice, these models are implemented in simulations where it is straightforward to account for wavelength-dependent material properties and complex designs. However, it can be helpful to have analytical starting points for constraining simulation models. Therefore in some aspects, a notch filter can be likened to a patch antenna/antenna array with a variable substrate thickness. A useful starting point in the design of a simple patch antenna, which can be thought of as a tunable notch, can be found in (Balanis, C. A., 2016, "Antenna Theory Analysis and Design", John Wiley and Sons, Inc. Hoboken N.J., 4th ed., pp. 798-811).

Figure 15A:
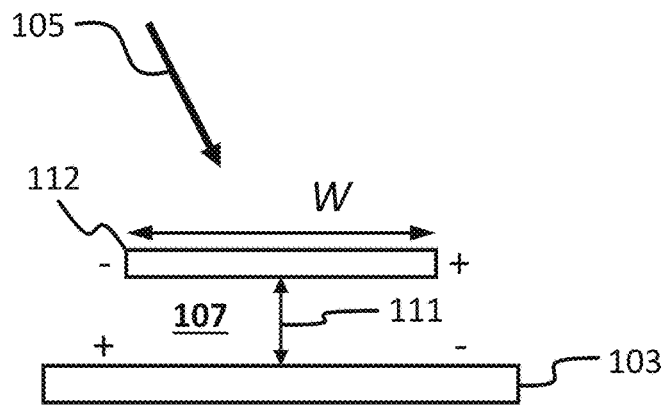
FIG. 15A depicts an instantaneous charge distribution in a surface element 112 and mirror layer 103 in response to incident EMR 105.

When EMR is incident on a finite conductive square patch (a surface feature 112) having width W, separated from a conductive surface by a gap 107 having a height, h, (gap distance 111) a charge will oscillate in the patch and produce a corresponding mirror charge in the mirror surface (mirror layer 103). FIG. 15A depicts an instantaneous charge distribution in a surface feature 112 that is a patch and mirror layer 103 in response to incident EMR 105. In this example, the gap distance is very small relative to the wavelength of incident light, h<<λ, such as λ/250. This simplified model ignores some elements (e.g., that the patch surface feature itself has a height) but captures the general trends and phenomena of the system.

As these charges oscillate back and forth, an electrical current density, J, is created in the surface feature 112 and a corresponding reverse current is created from the mirror charges, resulting in a magnetic dipole that oscillates in and out of the page, relative to FIG. 15A. This transverse mode magnetic oscillation dominates the physics of the device. Treating the gap between the surface feature 112 patch and the mirror layer 103 as a cavity, Balanis teaches that the resonant frequencies are given by:

$$f_{r,mnp} = \frac{1}{2\pi\sqrt{\mu\varepsilon}}\sqrt{\left(\frac{m\pi}{h}\right)^2 + \left(\frac{n\pi}{W}\right)^2 + \left(\frac{p\pi}{W}\right)^2}$$

Where n and p are into the page and parallel to the page, respectively. The lowest order mode is then:

$$f_{r,010} = \frac{1}{2\pi\sqrt{\mu\varepsilon}}\sqrt{\left(\frac{\pi}{W}\right)^2} = \frac{1}{2W\sqrt{\mu\varepsilon}}$$

Figure 15B:
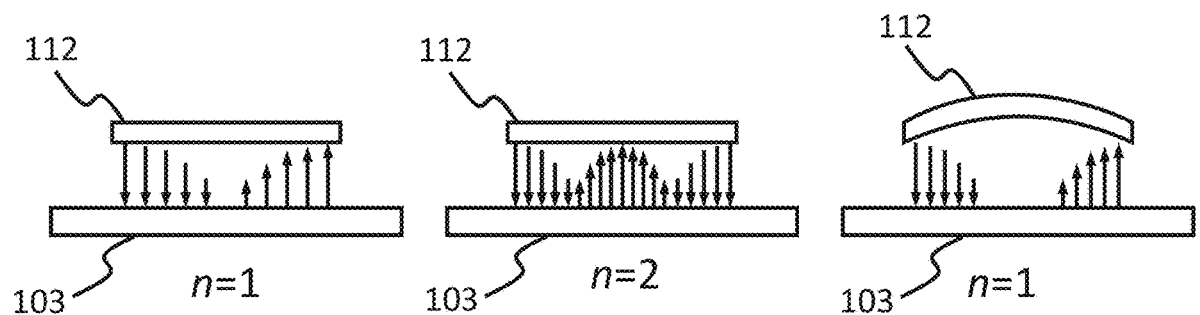
FIG. 15B shows the effect of a field concentrating surface feature 112 on n=1 mode preservation and n=2 mode suppression.

In a vacuum or air $c=1/\sqrt{\mu\varepsilon}$, and $\lambda=c/f$, so to select an initial estimate for a surface feature 112 dimension for absorption of wavelength λ, the surface feature 112 should be on the order of dimension λ/2. This model can also be used to anticipate and account for higher-order modes. FIG. 15B shows the effect of a field-concentrating surface feature 112 on n=1 mode preservation and n=2 mode suppression. For example, the n=1 mode has a node at the center of the patch, so it is least impacted by defects at that position. However, the n=2 mode has a field maxima at the center of the patch. To spoil this mode and prevent it from appearing in a notch spectrum, which is commonly desired for spectroscopy applications, in some aspects the center of a surface feature 112 can be designed to have a defect or, alternatively, to be bowed (field concentrating configuration), preserving the n=1 mode but suppressing the n=2 mode.

However, a more complete analysis is needed to treat the array configuration and the finite conductivities of the mirror 103 and antenna 101 layers. For that, the approach of Costa & Monorchio is one example (Costa, F., & Monorchio, A. (2012) Advanced Electromagnetics, vol. 1(3): pp. 7-12).

In some aspects notch filter 100 can be considered to be a frequency-selective surface (FSS) or a high-impedance surface (HIS). The magnitude of reflection of EMR is given by:

$$|R| = \frac{\text{Re}[\hat{Z}_s] - Z_{med}}{\text{Re}[\hat{Z}_s] + Z_{med}}$$

With $Z_{med}$ being the impedance of the surrounding media (e.g., a transparent medium like air, a window, or prism), which is assumed to be a real value, and $\hat{Z}_s$ being the complex-valued impedance of the absorbing structure (e.g., antenna layer array over mirror layer). Re is the real operator. The index of the media is $Z_{med}=\sqrt{\mu/\varepsilon}=Z_0/n$ for non-magnetic lossless dielectrics, with n the refractive index of the media. The reflection goes to zero at $\text{Re}[\hat{Z}_s]=Z_{med}$, which is the impedance matching condition: if the structure's impedance matches the surrounding media, no light is reflected. Therefore, in some aspects the goal is to design a structure that achieves this condition in a way that changes as a function of gap 107.

For the case of an array of surface features 112 that are square patches, Costa & Monorchio (Costa, F., & Monorchio, A. (2012) IEEE transactions on antennas and propagation, vol. 60(10): pp. 4650-4660) show that the total impedance is a sum of terms, one of which is the input impedance given by:

$$\text{Re}[Z_{in}] = \frac{Z_{med}}{\sqrt{\varepsilon'}}\left[\frac{\varepsilon''}{2\varepsilon'}\tan(kh\sqrt{\varepsilon'}) - \left(kh\frac{\varepsilon''}{2\sqrt{\varepsilon'}}\right)(1 + \tan^2(kh\sqrt{\varepsilon'}))\right],$$

where h is gap distance 111, k=2π/λ the incident wavenumber, and $\hat{\varepsilon}=\varepsilon'-i\varepsilon''$ is the complex permittivity of the antenna layer 101.

Assuming the supporting media impedance, $Z_{med}$, is constant or at least slowly varying with wavelength, there are only two free parameters: the gap and the free space propagation constant. To achieve the impedance matching condition, $\text{Re}[\hat{Z}_s]=Z_{med}$, it is required that the entire equation be constant as the gap distance 111 is changed. The solution is k=1/h. Consequently, the center of the notched wavelength 201 is expected to change linearly with gap distance 111: $2\pi h=\lambda$. This assumes that other contributions to impedance are also invariant with wavelength, which is approximately true. This approximation is more useful with small ohmic losses, but in the optical frequency regime (visible spectrum and near infrared), ohmic losses become increasingly important. The full form provided by Costa & Monorchio can be used with numerical solvers for a variety of conditions, and those with experience designing FSS, metamaterials, or antennas will be aware of a number of other means of designing an optimal notch to achieve their desired purposes (e.g., increasing or decreasing bandwidth). Typically, this task is performed with a variety of computational tools such as finite element methods, finite difference time domain methods, and frequency domain methods.

In some aspects, one or more of a notch filter 100 and an optical system 1200 or components thereof may be in communication with a computing device, data processor, or other hardware and software useful for data analysis. Examples of data processors that may be useful in aspects of the invention include but are not limited to one or more of a microprocessor, microcontroller, field-programmable gate array (FPGA), graphics processing unit (GPU), and other processor that can be used for analyzing EMR 106 reflected by notch filter 100. In some aspects, a data processor may also comprise computer software for calibration and/or for executing algorithms for determination and for analyzing EMR 106 reflected by notch filter 100 or EMR 105 incident on notch filter 100.

In some embodiments, machine-executable instructions can be stored on an apparatus in a non-transitory computer-readable medium (e.g., machine-executable instructions, algorithms, software, computer code, computer programs, etc.) When executed by a data processor, instructions can cause the processor to receive data about reflected EMR 106, data about gap distance 111, data from gap-adjusting device 109, or data from gap distance sensor 108 and to perform analysis of received data and/or to execute a process such as for example relaying information to gap-adjusting device to cause adjustment of gap distance 111. In some aspects, the machine-executable instructions can cause the data processor to receive an input of data on reflected EMR, determine information about EMR reflected by a notch filter, store data and information on a memory device that is communicatively coupled to the processor, analyze input data about gap 107 and/or gap distance 111, or transfer information about tuning notch filter 100 or to perform any combination of these functions.

Computing devices, components, and computer media that may be useful in embodiments described herein include, but are not limited to, a computer, storage device, communication interface, a bus, buffer, and data or image processors that are configured to perform calibration of a notch filter 100 and/or optical system 1200 or to receive, store, or process measurements that result from reflection of EMR by notch filter 100. In some embodiments, calibration, spectral component determination, implementing an algorithm, analysis of spectral and polarization components of incident EMR 105 and/or reflected EMR 106, and any compatible process related to notch filter operation may be implemented on a tangible computer-readable medium comprising computer-readable code that, when executed by a computer, causes the computer to perform one or more than one operations useful in embodiments described herein. A processor or processors can be used in performance of the operations driven by the tangible, computer-readable media. In some embodiments, tangible computer-readable media may be, for example, a CD-ROM, a DVD-ROM, a flash drive, a hard drive, system memory, a non-volatile memory device, or any other physical storage device. Alternatively, the processor or processors can perform those operations under hardware control, or under a combination of hardware and software control. In some embodiments of the invention, data resulting from measurements of response of an instrument, such as a radiation detector a camera, a radiometer, or a spectrometer to name a few, to reflected EMR 106 may be transferred to a storage device for processing at a later time or transferred to another computer system on demand via a communication interface.

In some embodiments, a monitor may be communicatively coupled to the processor and memory device to display input information, gap adjustment information, gap distance measurement information, information about incident EMR 105, or other information relevant to operation of notch filter 100. In some embodiments, instructions stored on the non-transitory machine-readable medium further encode a user interface that provides a graphical display on a monitor. The interface can allow a user to enter parameter information regarding for example notch filter 100 tuning and detector array 1201 electrical response (e.g., by allowing the user to upload a data file or by allowing the user to enter information into display fields shown on the user interface). In some embodiments, the user interface provides the user with options for analyzing the parameter information, such as various methods for displaying and/or saving the input data and/or detector response data (e.g., by displaying the data on the user's monitor, sending the data to a specified electronic device or electronic address, printing, and/or saving the data to a particular location). In various embodiments, data regarding notch filter operation, optical system operation, and other instrument operation may be stored as data in a non-transitory storage medium physically connected to a notch filter or optical system (e.g., on an internal memory device such as a hard drive on a computer) and/or stored on a remote storage device that is communicatively connected to the notch filter or optical system (e.g., by a wired or wireless intranet or internet connection and the like). In some embodiments, the user interface may provide the user with options for automatically storing the data in a particular location, printing the data, or sending the data to a specified electronic device or electronic address, or any combination of these.

It should be understood that the detailed description and the specific examples, while indicating specific embodiments of the invention, are given by way of illustration only, since various changes and modifications within the spirit and scope of the invention will become apparent to those skilled in the art from this detailed description. Other objects, features and advantages of the present invention will become apparent from the detailed description.

What is claimed is:

1. A tunable notch filter comprising:
an antenna layer positioned on a transmissive substrate;
a mirror layer positioned on a support substrate;
wherein the antenna layer and the mirror layer are positioned on opposite sides of a gap and facing each other, the gap having a gap distance, and
wherein the antenna layer and the mirror layer are configured for absorbing at least one wavelength of incident electromagnetic radiation by matching the impedance of the notch filter with the impedance of the at least one wavelength of incident electromagnetic radiation, and wherein the impedance of the notch filter is tunable by adjusting the gap distance.

2. The notch filter of claim 1, wherein the gap is devoid of a structural element.

3. The notch filter of claim 2, wherein the transmissive substrate comprises at least one of ZnSe, Si, Ge, or $Al_2O_3$.

4. The notch filter of claim 2, wherein the gap is a vacuum gap.

5. The notch filter of claim 2, wherein the gap is filled with a fluid.

6. The notch filter of claim 5, wherein the fluid is a liquid or a gas.

7. The notch filter of claim 1, configured for selectively attenuating the reflection of the at least one wavelength of incident electromagnetic radiation.

8. The notch filter of claim 1, wherein the antenna layer and the mirror layer are further configured for selectively attenuating the reflection of the at least one wavelength of incident electromagnetic radiation in a polarization-dependent manner.

9. The notch filter of claim 1, wherein the antenna layer and the mirror layer are configured for absorbing at least one wavelength of incident electromagnetic radiation regardless of the polarization state of the at least one wavelength of incident electromagnetic radiation.

10. The notch filter of claim 1, wherein either or both of the antenna layer and the mirror layer comprise at least one of Au, Cu, or Ag.

11. The notch filter of claim 1, wherein the transmissive substrate and the support substrate are part of an integrated mechanical fixture.

12. The notch filter of claim 1, wherein the transmissive substrate and the support substrate are each associated with a separate mechanical fixture.

13. The notch filter of claim 1, further comprising an antireflective coating positioned on the transmissive substrate such that at least part of the antireflective coating is between the transmissive substrate and the antenna layer.

14. The notch filter of claim 1, further comprising one or more than one gap distance sensor.

15. The notch filter of claim 14, wherein at least one gap distance sensor is a capacitive proximity sensor.

16. The notch filter of claim 1, wherein the transmissive substrate is a prism.

17. The notch filter of claim 16, configured such that at least some electromagnetic radiation entering the notch filter is reflected within the transmissive substrate prior to interacting with the antenna layer and mirror layer.

18. The notch filter of claim 1, wherein the antenna layer comprises a plurality of discrete surface features.

19. The notch filter of claim 18, wherein at least one of the plurality of discrete surface features have a square shape or cross shape.

20. The notch filter of claim 18, wherein at least some of the plurality of discrete surface features have approximately equal dimensions and are present in an array.

21. The notch filter of claim 18, wherein the mirror layer is a continuous film of conductive material.

22. The notch filter of claim 18 wherein one or more than one of the plurality of discrete surface features comprise a plurality of layers of conductive material.

23. The notch filter of claim 22 wherein the composition of at least a first layer in the plurality of layers is different from the composition of at least a second layer in the plurality of layers.

24. The notch filter of claim 1, further comprising one or more than one gap-adjusting devices.

25. The notch filter of claim 24, wherein at least one gap-adjusting device is a piezoelectric device.

26. The notch filter of claim 24, wherein at least one gap-adjusting device is electrostatically driven.

27. The notch filter of claim 24, wherein at least one gap-adjusting device is capable of adjusting the gap distance by an amount that is at least about 4 µm.

28. The notch filter of claim 1, configured such that the gap distance can be adjusted to be from about 10 nm to about 100 nm.

29. The notch filter of claim 1, configured such that the gap distance can be adjusted to be from about 30 nm to about 300 nm.

30. The notch filter of claim 29, configured such that the gap distance can be adjusted to be from about 50 nm to about 200 nm.

31. An optical system comprising the notch filter of claim 1 and a detector positioned to receive electromagnetic radiation reflected by the notch filter.

32. The optical system of claim 31, wherein the detector is an image sensor.

33. The optical system of claim 32, further comprising an imaging optic.

34. A camera comprising the optical system of claim 33.

35. A plurality of tunable notch filters comprising;
a first tunable notch filter, the first tunable notch filter comprising a first antenna layer positioned on a first region of a transmissive substrate, the transmissive substrate being a prism, and a first mirror layer positioned on a first support substrate, wherein the first antenna layer and the first mirror layer are positioned on opposite sides of a first gap and facing each other, the first gap having a first-gap distance; and
a second tunable notch filter, the second tunable notch filter comprising an antenna layer positioned on a second region of the transmissive substrate and a second mirror layer positioned on a second support substrate, wherein the second antenna layer and the second mirror layer are positioned on opposite sides of a second gap and facing each other, the second gap having a gap distance,
and wherein the first antenna layer and the first mirror layer are configured for absorbing a first at least one wavelength of incident electromagnetic radiation by matching the impedance of the first tunable notch filter with the impedance of the first at least one wavelength of incident electromagnetic radiation, and wherein the impedance of the first notch filter is tunable by adjusting the first gap distance,
and wherein the second antenna layer and the second mirror layer are configured for absorbing a second at least one wavelength of incident electromagnetic radiation by matching the impedance of the second tunable notch filter with the impedance of the second at least one wavelength of incident electromagnetic radiation, and wherein the impedance of the second notch filter is tunable by adjusting the second gap distance.

36. The plurality of tunable notch filters of claim 35, wherein the first tunable notch filter is configured to selectively attenuate the reflection of electromagnetic radiation having a first polarization state and the second tunable notch filter is configured to selectively attenuate the reflection of electromagnetic radiation having a second polarization state.

* * * * *